United States Patent [19]
Raman

[11] Patent Number: 6,014,624
[45] Date of Patent: Jan. 11, 2000

[54] METHOD AND APPARATUS FOR TRANSITIONING FROM ONE VOICE RECOGNITION SYSTEM TO ANOTHER

[75] Inventor: Vijay R. Raman, Mountain View, Calif.

[73] Assignee: NYNEX Science and Technology, Inc.

[21] Appl. No.: 08/844,534

[22] Filed: Apr. 18, 1997

[51] Int. Cl.[7] ...................................................... G10L 5/06
[52] U.S. Cl. .......................................... 704/243; 704/244
[58] Field of Search ................................... 704/243–245, 704/246, 251, 241, 256

[56] References Cited

U.S. PATENT DOCUMENTS

| | | | |
|---|---|---|---|
| 5,732,393 | 3/1998 | Aoshima | 704/246 |
| 5,778,342 | 7/1998 | Erell et al. | 704/256 |
| 5,835,890 | 11/1998 | Matsui et al. | 704/255 |
| 5,842,165 | 11/1998 | Raman et al. | 704/255 |
| 5,845,246 | 12/1998 | Schalk | 704/243 |
| 5,854,999 | 12/1998 | Hirayama | 704/226 |

*Primary Examiner*—David D. Knepper
*Attorney, Agent, or Firm*—Straub & Pokotylo; Michael P. Straub

[57] ABSTRACT

Converting speech recognition templates or models from a first format to a second format improves the recognition rate achieved using the converted templates or models. Storing source and/or scoring information for templates or models so that converted models or templates can be scored differently than original models or templates reflects the effect the conversion process has on recognition scores. In order to enhance recognition results in one embodiment, an available compressed voice recording is used in the conversion process. The conversion process of the present invention is described using the conversion of dynamic time warping templates into Hidden Markov Models. Generating garbage models are also described. In one embodiment, a garbage model is generated dynamically at recognition time using a period of silence in the utterance upon which the recognition operation is to be performed as the source of the data required to generate the garbage model.

30 Claims, 13 Drawing Sheets

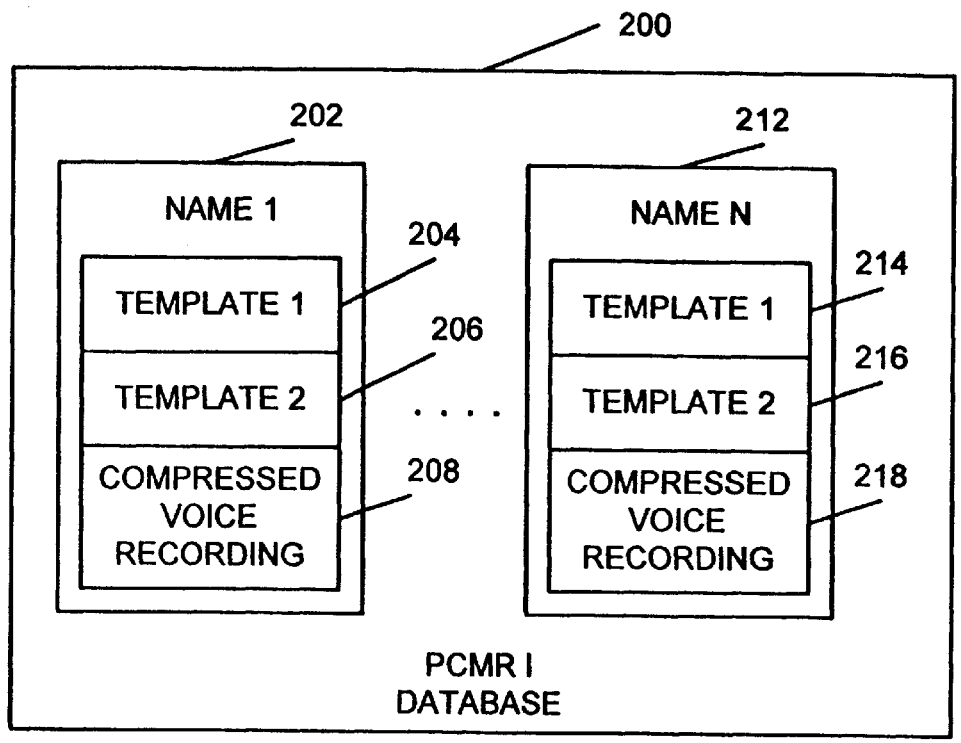
PRIOR ART FIG. 2A
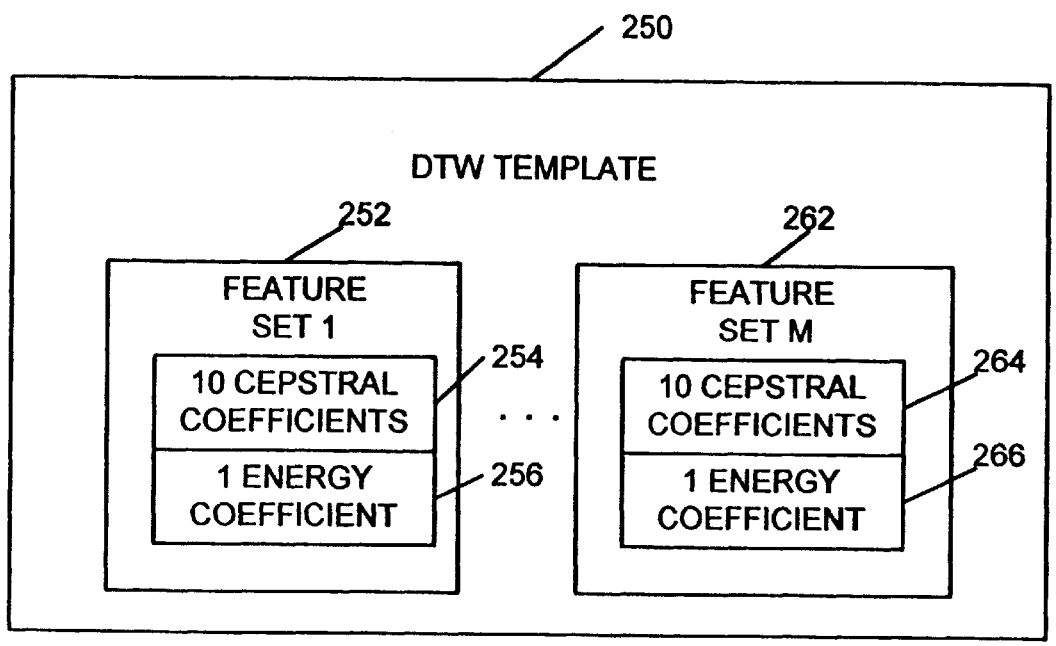
PRIOR ART FIG. 2B

| TEST DATABASE | RECOGNITION ERROR RATE | |
|---|---|---|
| | FOR CONVERTED MODELS GENERATED FROM DTW templates | FOR CONVERTED MODELS GENERATED FROM DTW templates+16K Confirmation recording |
| 10 spkrs, vocab-size 20 rep. 20 | 8.3% | 4.3% |
| 15 spkrs, vocab-size 11 reps 20 | 2.59% | 1.01% |

METHOD AND APPARATUS FOR TRANSITIONING FROM ONE VOICE RECOGNITION SYSTEM TO ANOTHER

FIELD OF THE INVENTION

The present invention relates to speech recognition systems and, more particularly, to methods and apparatus for transitioning from one speech recognition system to another and/or for reusing speech recognition data included in existing speech recognition databases.

BACKGROUND OF THE INVENTION

Speech recognition involves the identification of words or phrases in speech. It generally involves using a speech recognition system including, e.g., a computer, that analyzes the speech according to one or more speech recognition methods to identify the words or phrases included in the speech. Speech recognition may be either speaker dependent, speaker independent or a combination of both.

Speaker dependent speech recognition normally uses a computer that has been "trained" to respond to the manner in which a particular person speaks. In general, the training involves the particular person speaking a word or phrase, converting the speech input into digital signal data, and then generating a template or model of the speech which includes information about various characteristics of the speech. Because template and modules include speech characteristic information, e.g., energy level, duration, and other types of information, templates and models are well suited for speech recognition applications where such characteristics can be measured in received speech and compared to the information included in the templates or models. However, because templates and models do not include all speech characteristics less speech information can be derived from a template or model than can be derived from a voice recording which has not been compressed.

Templates or models generated during a speech recognition training process are normally stored in a database for future use during a speech recognition operation. During real time speech recognition applications, input speech is processed in a manner similar to that used to generate a template or model during training. The signal characteristic information or data generated by processing the speech upon which a recognition operation is to be performed is then normally compared to a user's set of templates or models and/or speaker independent templates or models. The best match between the input speech and the templates or models is determined in an attempt to identify the speech input. Upon recognition of a particular word or phase, an appropriate response is normally performed.

Speaker independent speech recognition normally uses composite templates or models or clusters thereof, that represent the same sound, word, or phrase spoken by a number of different persons. Speaker independent templates are normally derived from numerous samples of signal data to represent a wide range of pronunciations. Such data can often be collected during the normal course of business by various services or from a company's own employees thereby eliminating the need for users of the speech recognition system to be consciously involved in the generation of speaker independent speech recognition templates or models.

Referring now to FIG. 1, there is illustrated a known voice dialing telephone system 100 which supports a speech recognition capability. The known system 100 includes a plurality of telephones 101, 102 which are coupled to a switch 116. The switch 116, in turn is coupled to what is sometimes referred to as an intelligent peripheral 124 via a T1 link. The intelligent peripheral 124 is responsible for supporting voice dialing services by performing speech recognition operations and outputting telephone numbers to the switch associated with spoken names, words, or phrases which are to be used to complete the call initiated by the voice dialing service subscriber.

Upon receiving a request from a voice dialing service subscriber to initiate a voice dialing call, the switch 116 couples the subscriber to the intelligent peripheral 124. The intelligent peripheral 124 than process the subscribers speech to identify names and/or commands in the subscribers speech. This is done using the speech recognizer 126, application processor 130 and database 129.

The application processor 130 controls the storage and retrieval of speaker dependent and speaker independent templates or models stored in the database 129. Frequently speaker independent templates or models are used for commands while speaker dependent templates or models are used for names of individuals to be called. Thus, the database 129 normally includes subscriber specific speech recognition information, e.g., a plurality of speaker dependent templates or models, for each subscriber. In addition, the database 129 normally includes a destination telephone number or instruction associated with each stored speaker dependent template or model and, optionally, a compressed voice recording of the name represented by the template or model which can be played back to the subscriber when placing a call to the number associated therewith. Each subscriber may have a plurality of speaker dependent templates, e.g., of 20 or more names. Accordingly, the creation of a subscriber's speaker dependent templates may represent a substantial investment in terms of training time contributed on the part of each individual subscriber. Speaker dependent templates or models for an individual subscriber are normally retrieved from the database 129 and loaded into the speech recognizer 126 each time the individual subscriber attempts to initiate a voice dialing operation.

In as much as a system of the type illustrated in FIG. 1 may have many thousands of subscribers, it can be appreciated that the cumulative investment in subscriber time in generating the stored speaker dependent templates can be quite substantial.

Over time the cost of computers and electronics has decreased while, at the same time, the processing power of such devices has increased. In addition, over time, various advances in speech recognition techniques have resulted in increased recognition accuracy. Such improvements in both speech related recognition hardware and the methods by which speech recognition is performed have provided a significant incentive to users of speech recognition systems, e.g., telephone companies among others, to upgrade older systems and to increase the use of speech recognition systems in general. In addition, with the increased use of speech recognition systems in general, it has become desirable to be able to port a set of speech templates or models created for one application to another application.

Unfortunately, switching from one speech recognition system to another rarely involves a simple substitution of hardware and/or software. This is because databases, e.g., databases of speech recognition templates, used with one, e.g., older speech recognition system, will frequently include data, e.g., speech recognition templates or models, which are incompatible with another, e.g., newer, speech recognition system due to differences in the speech characteristic information included in the speech recognition templates or models. Differences in template or model format or data storage techniques may also complicate matters.

At the present time many users of speech recognition systems are being confronted with the problem of transitioning from older speech recognition systems and platforms to newer ones. Or, alternatively, the problem of sharing or using speech recognition templates or models developed for one application or system with another application or system. As discussed above, various applications and/or systems often use different models or templates with differences in the speech characteristic information stored therein.

Because of the differences between the templates and models used in various applications and systems it is often necessary to generate new speaker dependent templates or models to replace already existing ones when transitioning from one application or system to another. Unfortunately, since the original utterances used to generate the stored templates or models are normally not available to serve as the basis for the generation of new templates or models, it is often necessary to have each user of the speech recognition system repeat the training process for the new application or system. Accordingly, new speaker dependent templates or models often need to be generated to replace those previously used with an application or system being replaced.

The need for users of a speaker dependent speech recognition system to actively participate in the training of a new speech recognition system is a substantial deterrent to the replacement or upgrading of older speech recognition systems. Consider, for example, the case of the telephone provider who provides voice dialing services to many thousands of customers and the inconvenience to those customers that would result if they had to participate in generating entirely new sets of speaker dependent templates or models to replace already existing ones. Differences between speech templates and/or models developed for one system or application, and those developed for other applications or systems have greatly reduced the ability to share or re-use existing speech recognition databases.

In view of the above, it becomes apparent that there is a need for methods and apparatus which are capable of facilitating the transitioning from one speech recognition application or system to another without requiring the generation of new sets of speech recognition templates. Such methods and apparatus may be required, e.g., when upgrading speech recognition applications and systems; when a service provider desires to change vendors or to deploy multiple vendors without impacting an existing customer base and/or when a customer changes residences and wishes to carry his speaker dependent directory, e.g., with a large number of trained names, with him to a new service provider.

Thus, there is a need for methods and apparatus which will allow the reuse and/or sharing of speech recognition templates or models developed for one application or system with another application or system which uses templates or models having a different characteristic information content and/or format. As with most speech recognition systems it is also desirable that any new methods and/or apparatus achieve a suitable recognition rate and degree of accuracy when used.

SUMMARY OF THE PRESENT INVENTION

The present invention is directed to methods and apparatus for transitioning from one speech recognition system to another and/or for reusing existing speech recognition databases. In accordance with the present invention, speech recognition templates, models and/or compressed voice recordings are processed to generate new speech recognition templates, models or recordings therefrom. The generated templates or models, e.g., intended for use by a different speech recognition application or system than the original templates or models are referred to as converted templates or models. Converted templates or models may include some speech characteristic information which is not included in the original templates or models. In accordance with the present invention, this additional speech characteristic information is derived from one or more original templates or models and/or a voice recording which may be stored in a compressed format. Speech characteristic information which is included in the original templates or models but which is not included in the converted templates or models is discarded.

While the methods and apparatus of the present invention can be used to generate new speech recognition templates or models purely from existing templates or models, tests have shown that the use of a compressed voice recording, when available, can significantly improve the recognition results achieved using converted speech recognition templates or models. Accordingly, in at least one embodiment, voice recordings, e.g., a compressed voice recording, in addition to existing templates or models are used as the basis for generating new templates or models.

As part of the template or model generation process of the present invention, coefficient data included in source templates or models is dequantized. In order to optimize the results achieved using templates or models generated from the dequantized coefficients, in one embodiment, the dequantization process is not matched to the original quantization process as one might expect. Instead, quantization tables and/or coefficients are used in the dequantization process which are optimized to achieve superior performance during recognition time when using converted speech recognition models or templates.

A speech recognition database may include both converted models or templates as well as original models or templates generated directly from complete speech utterances. In one embodiment, information about the source of speech recognition templates or models stored in a speech recognition database is included in the database along with the model or template to which the source information corresponds. The model or template source information is used, in one embodiment, during recognition operations involving both converted models or templates and original models or templates. The source information allows converted models or templates to be scored differently than original models or templates. In addition to, or in place of, source information, model scoring information, e.g., weighting factor information, can be generated and stored in a database along with the templates or models to which the scoring information corresponds. In this manner scoring can be tailored to reflect the effect the model or template conversion process has on speech recognition scores.

As part of the template or model conversion process of the present invention, after the generation of a converted speaker dependent template or model, one or more speaker dependent garbage models are generated from the converted model and/or other speaker dependent models in the speech recognition database. In this manner, garbage models are generated from speech information provided by the user and/or user trained templates or models, as opposed to data which is obtained from other sources.

In one particular embodiment, a background or silence model is generated dynamically, e.g., on the fly, at the time a user of a speech recognition system of the present invention initiates a speech recognition operation. Such a model may be generated using a period of silence, included in the utterance upon which a recognition operation, as the source of data for the silence or background model. This approach to generating background or silence models is particularly useful where background noise may vary from the background noise data used to build the static silence models. Dynamic generation of silence models in accordance with the present invention is particularly well suited, e.g., to telephone applications where background and line noise may vary from call to call.

Many other details, features and embodiments of the present invention are described below in the detailed description that follows.

BRIEF DESCRIPTION OF THE DRAWINGS

FIG. 2A illustrates a first known speech recognition database.

FIG. 2B illustrates a speaker dependent speech recognition template stored in the database illustrated in FIG. 2A.

DETAILED DESCRIPTION

Figure 1:
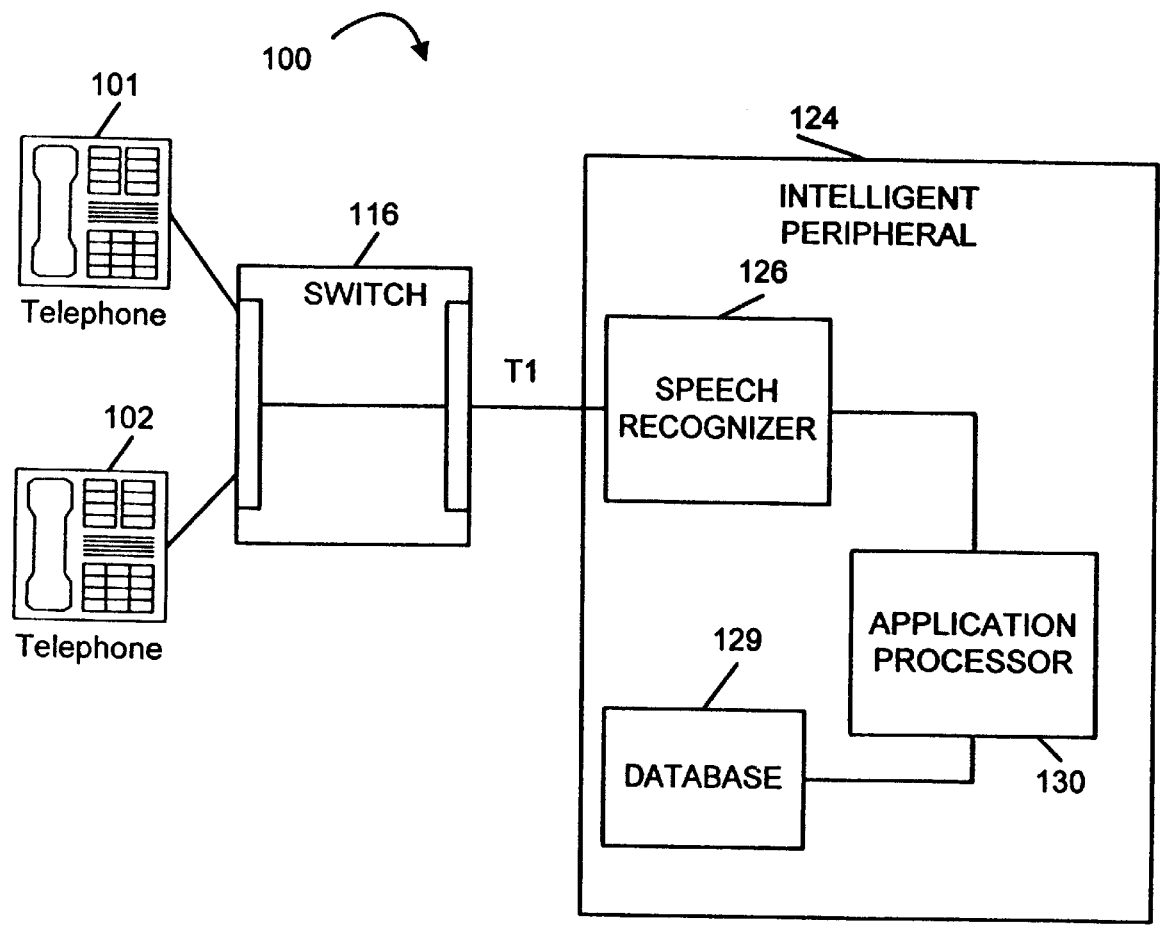
FIG. 1 illustrates a known telephone system including a speech recognizer.

The present invention is directed to methods and apparatus for transitioning from one speech recognition system to another and/or for reusing existing speech recognition databases. As discussed above, the present invention includes methods of generating new models or templates, used for speech recognition purposes, from old models or templates. It also includes methods and apparatus for using the generated models or templates for generating garbage models, and for updating said models and templates over time.

For purposes of explanation, various methods, apparatus, and features of the present invention will be described in the exemplary context of converting speaker dependent speech recognition templates of a first known speech recognition system, e.g., a PCMR I speech recognition system, into speaker dependent speech recognition models suitable for use in a more modern speech recognition system, e.g., a PCMR II speech recognition. Both PCMR I and PCMR II speech recognition systems (where PCMR stands for pulse code modulation recognizer) are speech recognition systems which have been developed by NYNEX Corporation for use in providing voice dialing services.

In the exemplary embodiment involving the conversion of PCMR I speaker dependent speech recognition templates to PCMR II type speaker dependent speech recognition models, the terms PCMR I templates and PCMR II models are used to refer to templates and models having formats specific to these particular exemplary speech recognition systems. However, elsewhere in the application, e.g., in the claims and abstract, the terms templates and models are intended to broadly refer to speech recognition data corresponding to, and representing, characteristics of a particular word, phrase or utterance which can be used for speech recognition purposes. In the present application, the phrase PCMR I templates is used to refer to what are known in the art as dynamic time warping (DTW) templates. The phrase PCMR II models, on the other hand, is used to refer to what are known in the art as Hidden Markov Models (HMMs).

As discussed above, one feature of the present invention is directed to converting exiting speech templates or models into new speech templates or models which are suitable for use with a different, e.g., newer speech recognition system. This feature of the present invention will be described in the context of using the processing system 500 illustrated in FIG. 5A to convert one or more DTW templates, e.g., such as the one 250 illustrated in FIG. 2B, into an HMM, e.g., such as the one 350 illustrated in FIG. 3B.

Referring now to FIG. 2A, there is illustrated a PCMR I database 200 which may serve as the source of the DTW template(s) to be converted. As illustrated, a PCMR I database includes, for each utterance, e.g., word, name, or phase to be identified, a separate set of speech characteristic data 202, 212. In the context of this example, each set of data 202, 212, corresponds to a particular name which is to be identified by a speech recognition system. The name may be, e.g., part of a database which forms a telephone customer's speaker dependent voice dialing directory.

In the illustrated embodiment, two DTW templates (204, 206) (214,216) are stored for each name along with an optional voice recording 208, 218 of the name (utterance) represented by the two templates. It is to be understood that any number of templates corresponding to each individual name may be incorporated into the database 200 and used in generating models therefrom although the following example involves only the use of two such templates. Additional templates may be used in a manner similar to that of the second template to improve the quality of models generated from templates.

The optional voice recording 208, 216 is stored in a compressed format, e.g., as a 16K ADPCM recording to reduce data storage requirements. During a recognition operation, the voice recording may be played back to a system user after a name is recognized, e.g., as part of the phrase "Dialing Name 1" in order to provide a voice dialing system user the opportunity to know who is being called and to abort a call if the wrong name has been identified. As will be discussed below, this confirmation recording can be used during the template conversion process, when available, to enhance the reliability and accuracy of the recognition rate achieved with the speech recognition models generated in accordance with the present invention.

During training of a PCMR I speech recognition system, a user is requested to speak a name for which a template is to be generated at least two, but preferably three or more times. Each template corresponds to a different one of these utterances. The confirmation recording may correspond to one of the utterances used to generate the DTW templates 204, 206 or an additional utterance of the name corresponding to the template by the same user.

Referring now to FIG. 2B, there is illustrated a known DTW template 250. The known DTW template 250 includes a plurality of feature sets 252, 262 wherein each feature set corresponds to one frame of the utterance used to generate the template. In PCMR I a frame is a 22.5 ms sound segment which is part of the utterance of the name. Accordingly, in PCMR I, a name that is stated in a 225 ms utterance would include 10 frames, where each frame would be represented by a different feature set. Thus a 225 ms name would be represented by a template having 10 feature sets 252, 262. In PCMR I each feature set includes 10 cepstral coefficients 254, 264 and 1 energy coefficient 256, 266. In PCMR I the coefficients are represented using 4 bit quantization, that is, four bits are used to represent each coefficient with each coefficient being assigned one of a possibility of 16 different coefficient values.

Figure 3A:
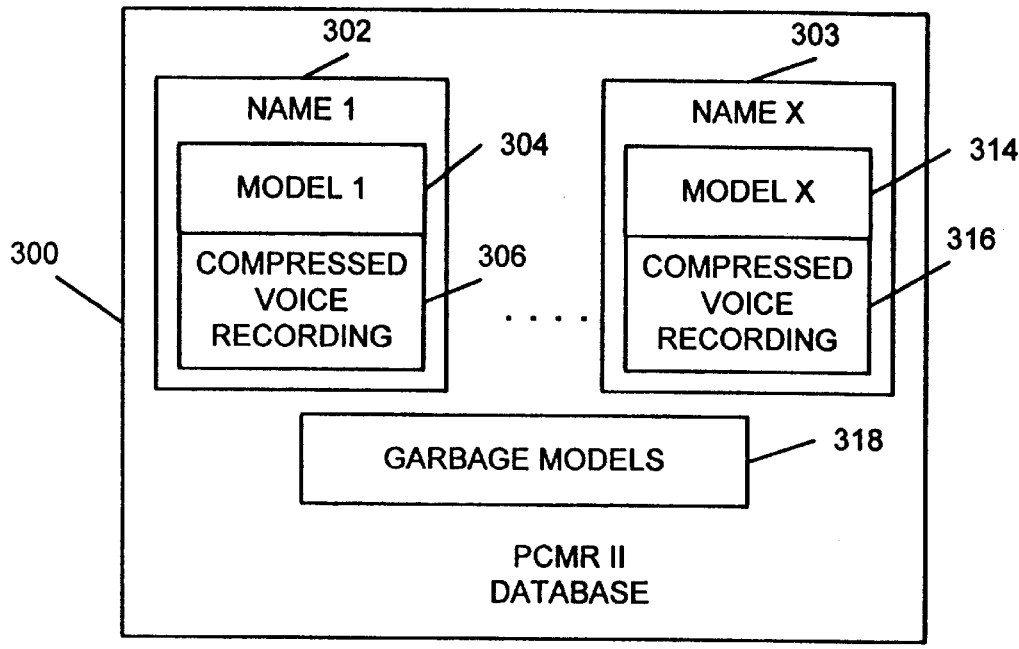
FIG. 3A illustrates a second known speech recognition database implemented in accordance with a more recent speech recognition technique than that of the database illustrated in FIG. 2A.

As discussed above, PCMR II uses Hidden Markov Models as opposed to DTW templates for speech recognition purposes. Referring now to FIG. 3A there is illustrated a PCMR II database 300. As illustrated the PCMR II database 300 includes data corresponding to a plurality of names (utterances) and a plurality of garbage models 318. For each name, a single Hidden Markov Model (HMM) 304, 314 is stored along with an optional compressed voice recording 306, 316. Unlike DTW templates which are generated from a single utterance, each HMM 404 is generated from a plurality of utterances, e.g., of the same name, and therefore represents a composite of the features of multiple utterances.

Figure 3B:
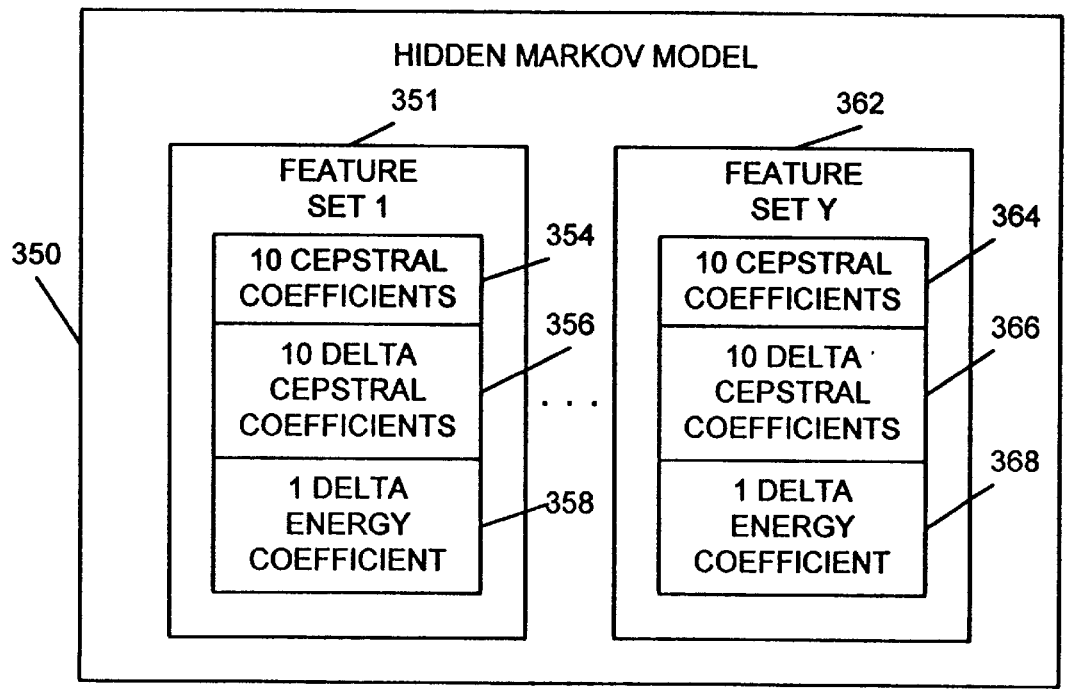
FIG. 3B illustrates a speaker dependent speech recognition model stored in the database illustrated in FIG. 3A.
Figure 4:
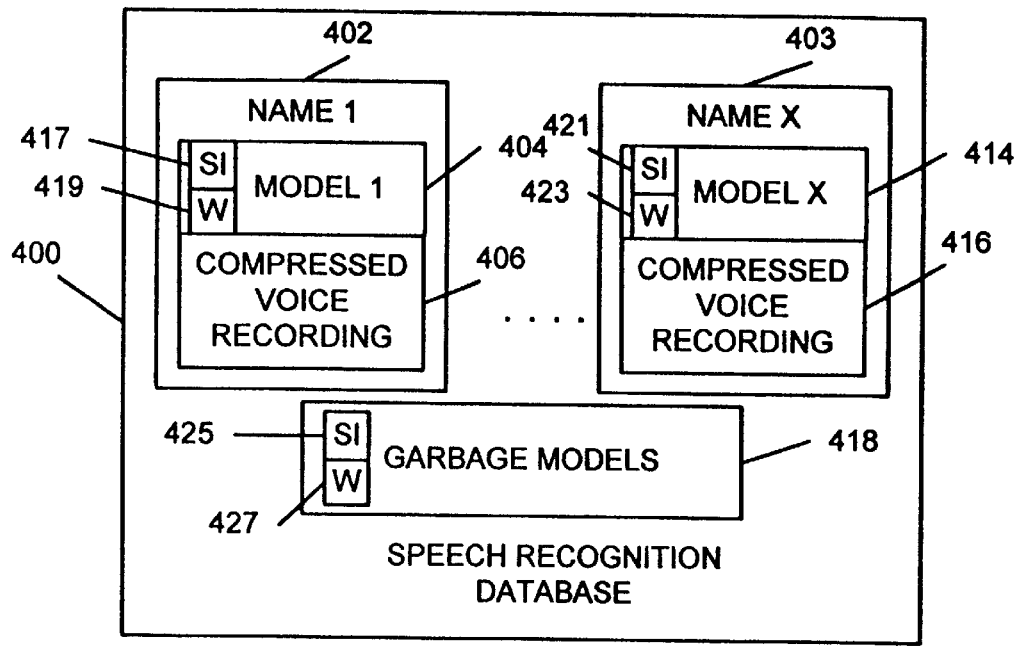
FIG. 4 illustrates a speech recognition database implemented in accordance with one embodiment of the present invention.

Referring now to FIG. 3B, there is illustrated an HMM 350 which, as illustrated, includes a plurality of feature sets also sometimes referred to as states. In the PCMR II embodiment each feature set 351, 362 includes 10 cepstral coefficients 354, 364; 10 delta cepstral coefficients 356,366 and 1 delta energy coefficient 358, 368 which are represented using 8 bit quantization. Accordingly, in PCMR II 8 bits are used to represent each of the coefficients which are part of a feature set 351, 362. Thus, each coefficient is assigned one of 256 possible values. Thus PCMR II allows for a much finer representation of the coefficient values than PCMR I which provides a range of only 16 different possible coefficient values.

In PCMR II a HMM 350 is generated from at least two utterances of the same name in the following manner. However, more than two utterances, e.g., any number of utterances may be used in the creation of the HMM desired. A first utterance is divided up into a plurality of 20 ms frames and a coefficient set is generated for each of the frames. Each frame coefficient set includes 10 cepstral coefficients, 10 delta cepstral coefficients, and 1 delta energy coefficient. Once generated, the frame coefficient sets are analyzed and grouped according to common characteristics. The grouped coefficient sets are then represented by a preselected number of feature sets, e.g., one of a fixed number of feature sets is used to represent each group of frame coefficient sets. The number of feature sets used to represent each utterance may be chosen as a function of an utterance's duration and will normally be less than the number of frames which make up the utterance. In one PCMR II embodiment, 8, 16, or 20 feature sets are used to represent a name where the number of feature sets used is determined as a function of the names length, i.e., the duration of the spoken utterance representing the name being modeled. As the result of the frame grouping process and the use of fewer feature sets than frames to represent an utterance, in an HMM a single feature set may represent multiple frames. The first generated plurality of feature sets corresponding to the first utterance of a name is sometimes referred to as a "seed".

In order to generate an HMM a second utterance of the same name is processed in a manner similar to the first utterance. The second plurality of feature sets generated in this manner is then combined with the first plurality of feature sets in a process known as alignment. The result of aligning the second plurality of feature sets against the seed is a third plurality of feature sets 351, 362 which, when quantized, generate the HMM 350 corresponding to the name being modeled. Because the HMM 350 will normally include fewer feature sets than there are frames in the individual utterances from which the model is generated, HMMs offer a relatively efficient way, as compared to DTW templates, in which to store utterance characteristic information intended to be used for speech recognition purposes.

From the above discussion, it is readily apparent that there is a significant difference between DTW templates used in the PCMR I speech recognition system and Hidden Markov Models used in the PCMR II speech recognition system.

In accordance with one embodiment of the present invention, Hidden Markov Models are generated from existing DTW templates as opposed to uncompressed sampled speech as is the usual case. This allows a service provider to transition from one speech recognition system, e.g., the PCMR I system which uses DTW templates, to a system, e.g., the PCMR II system which uses HMMs, without requiring users to actively participate in training new HMMs corresponding to names or utterances for which the user previously participated in the generation of speaker dependent DTW templates. While, in one embodiment of the present invention, an HMM is generated from two DTW templates, in another embodiment a compressed voice recording associated with the DTW templates is also used in the generation of the HMM. As will be discussed further below, the use of recordings in addition to existing DTW templates, when generating HMMs has proven to provide superior speech recognition results than when DTW templates alone are used.

The present invention recognizes that the manner in which a speech template is generated may have an effect on how closely the model will match speech during a recognition process. Because of the relative coarseness of the original feature quantization of converted templates, and differences in frame rates between original source templates and converted models or templates generated therefrom, a poorer match between incoming speech and converted models will generally result then between incoming speech and original HMM-trained models.

After conversion a user will normally add names to his speaker dependent speech recognition database. This results in the addition of new original HMMs for names not already included in the database. In addition, a speaker's user's speaker dependent speech recognition database may be updated by the user, or in accordance with one embodiment of the present invention, automatically in a manner that is transparent to the user.

The present invention recognizes that the score, in terms of how closely an utterance is determined to match the model at recognition time, is likely to be better for models generated from uncompressed speech than from converted templates and/or compressed voice recordings and that some compensation should be performed at the time of a speech recognition operation to take this into consideration. The present invention recognizes that it is desirable to score models that are generated differently, in a different manner. This for compensation at recognition time for the differences in scoring that will result, e.g., during the performing of a Viterbi search, when using models generated from different sources of data and/or models generated using different algorithms. To support different scoring the recognition system of the present invention may use, e.g., weighting factors at scoring time which vary depending on the method and/or source of the template or model being used for recognition purposes. In one set of tests, by optimizing the weighting factors used during scoring, recognition results approximating that achieved using only original HMMs were achieved when using a combination of original and converted HMMs.

To facilitate model generation process dependent scoring at recognition time, a speech recognition database 400, implemented in accordance with the present invention, stores source information (SI) 417, 421 and/or weighting factor (WF) information 419, 423 for some or all of the models 404, 414 stored therein. Accordingly, a speech recognition database 400, implemented in accordance with one embodiment of the present invention, comprises for each name that is to be recognized a set of data 402, 403 which includes a model of the name 404, 414, and a compressed voice recording 406, 416. In addition, for each model 402, 403, source indicator information 417, 421 and/or weighting factor information may also be stored in the database 400. The data base 400 also includes a plurality of garbage models 418 for which separate source 425 and/or weighting factor information 427 may be stored. As will be discussed below, in accordance with one embodiment of the present invention garbage models are used in a new and novel manner to increase recognition accuracy.

Figure 5A:
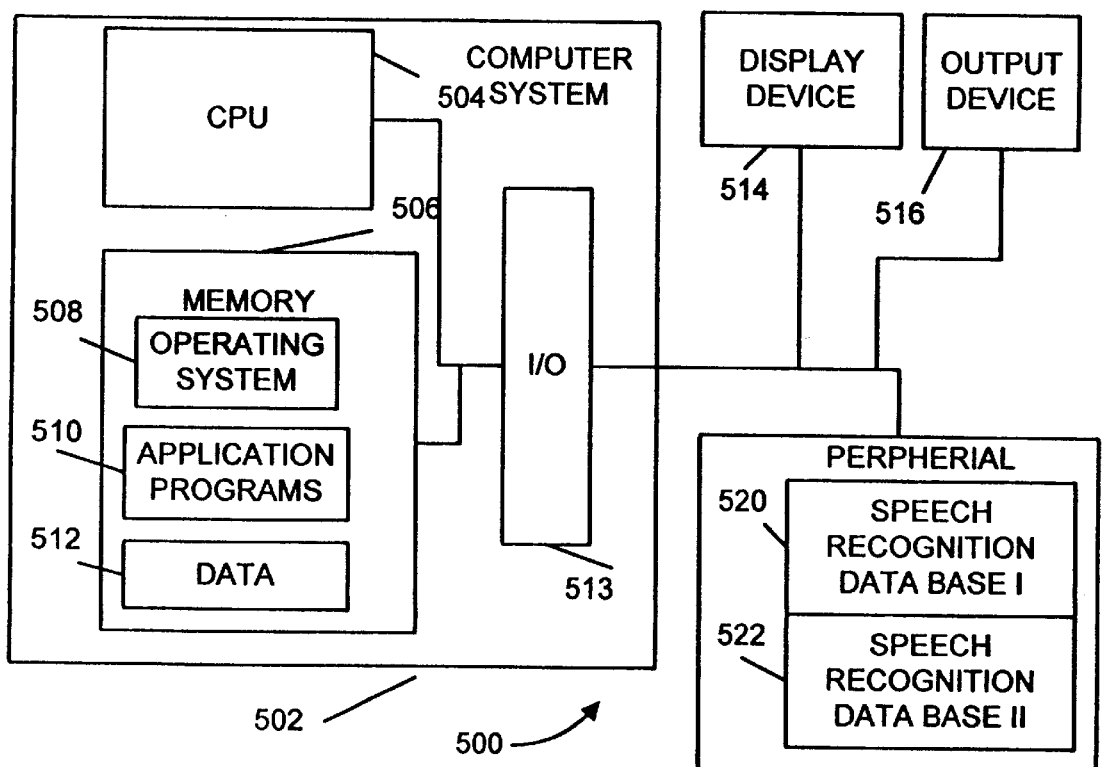
FIG. 5A illustrates a system for processing a speech recognition database in accordance with the present invention.

Referring now to FIG. 5A, there is illustrated a system 500 which may be used for converting DTW templates into HMMs in accordance with one embodiment of the present invention. As illustrated the system 500 includes a computer system 502, a display device 514, an output device 516, and a peripheral device 518. The computer system 502 may be implemented, e.g., as a personal computer. The computer system 502 includes a central processing unit 504, an input/output interface 513 and a memory device 506, for storing, e.g., an operating system 508, application programs 510 and data 512. The I/O interface 513 serves as the electrical interface between the CPU 504 and memory 506, and the external devices, e.g., the display device 514, output device 516 and peripheral 518. The peripheral device 518 includes a data storage device, e.g., array of hard disks, in which a first speech recognition database 520 and a second speech recognition database 522 are stored. The first speech recognition database 520 may be the same as or similar to the known database illustrated in FIG. 2A while the second speech recognition database 522 may be the same as or similar to the speech recognition database 400 of the present invention. While two distinct databases are illustrated in the exemplary embodiment, a single database could be used with converted models being stored in the database in place of the templates from which the models are created. In addition, while the peripheral 518 is illustrated as being external to the computer system 502, it could be implemented as an internal component of the computer system 502.

As will be discussed below, the database conversion routine illustrated in FIG. 5B, and the various subroutines illustrated in the other figures of the present application, may be implemented as application programs 510 which are stored in the memory 506. It should be understood that the exemplary conversion routine 550 addresses the issue of converting the speaker dependent templates of a single user into speaker dependent models. In order to process sets of speaker dependent models corresponding to different users, it would be called multiple times. Under control of the database conversion routine, the CPU 504 may operate to access, via the I/O interface 513, the first speech recognition database 520, and generate models from templates and/or compressed voice recordings included therein. In accordance with the present invention the models thus generated are used to create or supplement the data included in the second speech recognition database 522.

The various routines and subroutines of the present invention, associated with converting DTW speech recognition templates and/or compressed voice recordings into hidden Markov models will now be described with references to FIGS. 5B through 8B. In these figures, ovals are used indicate program termination points, rectangle are used to represent processing steps, circles to represent connecting points between program routines or jumps to and from subroutines, and non-rectangular parallelograms are used to represent data generated by, or input to, the various processing steps.

Figure 5B:
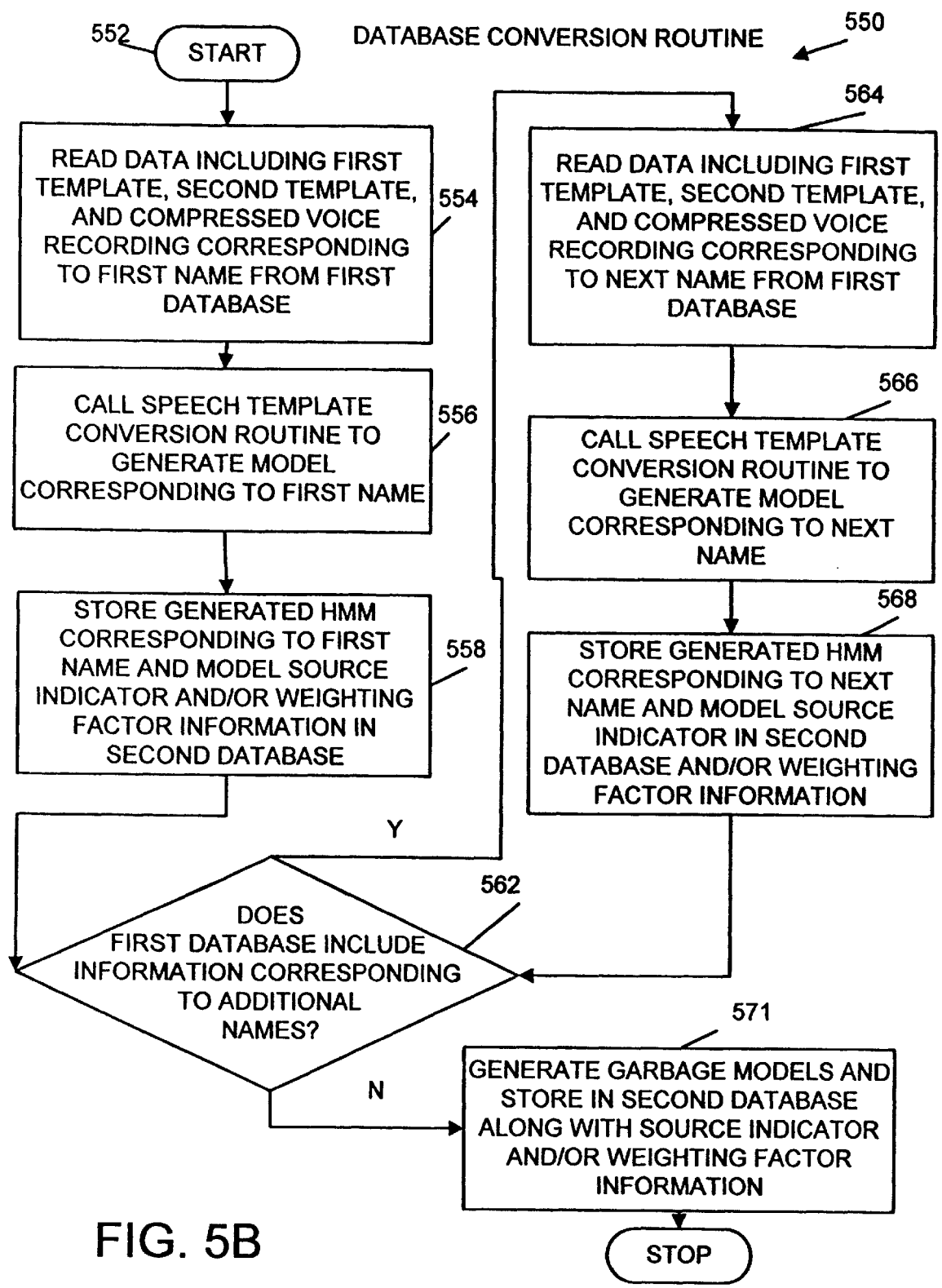
FIG. 5B illustrates the steps of processing a speech recognition database in accordance with one embodiment of the present invention.

As illustrated in FIG. 5B, the speech recognition database conversion routine 550 begins with the START step 552. In this step various system initialization procedures occur associated with executing the routine 550. Once initialization has occurred, operation progresses to step 554 wherein data associated with a first name to be modeled is read from the first database 520. The data read from the first database 520 includes first and second templates 204, 206 and a compressed voice recording 208 corresponding to an utterance of the first name.

Once the data corresponding to the first name is read from the first database 520, operation progresses to step 556, wherein the speech template conversion routine 600 is called and used to generate a model 404 corresponding to the first name. The speech template conversion routine 600 will be discussed in detail below in regard to FIG. 6.

Operation progresses from step 556 to step 558 wherein the generated model 404 is stored in the second speech recognition database 522. Also stored in the second database 522 and associated with the model 404 of the first name, is model source indicator and/or weighting factor information 417, 419.

Following the storage of the generated model 404, operation progresses to step 562 where it is determined if the first database 520 includes information corresponding to additional names which needs to be processed.

If the first database 520 includes information, corresponding to one or more additional names, which needs to be processed, operation progresses to step 564. In step 564 the data including the first and second templates 214, 216 and the compressed voice recording corresponding to the next name (e.g., NAME N assuming the first database 200 includes only NAME 1 202 and NAME N 212) is read from the database 200. Once the data corresponding to the next name is read from the first database 520, operation progresses to step 566, wherein the speech template conversion routine 600 is called and used to generate a model 414 corresponding to the data read from the first database 520.

Operation progresses from step 566 to step 568 wherein the generated model 414 is stored in the second speech recognition database 522. Also stored in the second database 522 and associated with the model 414 is model source indicator and/or weighting factor information 421, 423. Operation then progresses to step 562 where it is once again determined if the first database 520 includes information corresponding to additional names which needs to be processed.

If, in step 562, it is determined that no additional information remains in the first database 200 that needs to be processed, operation progresses to step 571. In step 571 garbage models are generated and stored in the second database 552 along with garbage model source indicator and/or weighting factor information 425, 427. In the illustrated embodiment, these speaker dependent garbage models are generated from the stored unquantized second feature set representations which correspond to the converted HMMs. Alternatively, the garbage models may be generated from the HMMs. The garbage models generated in step 571 may be used to replace all or some of previously generated speaker dependent garbage models.

From step 571 operation progresses to the STOP step 572 in which the speech recognition database conversion routine 550 terminates.

Figure 6A:
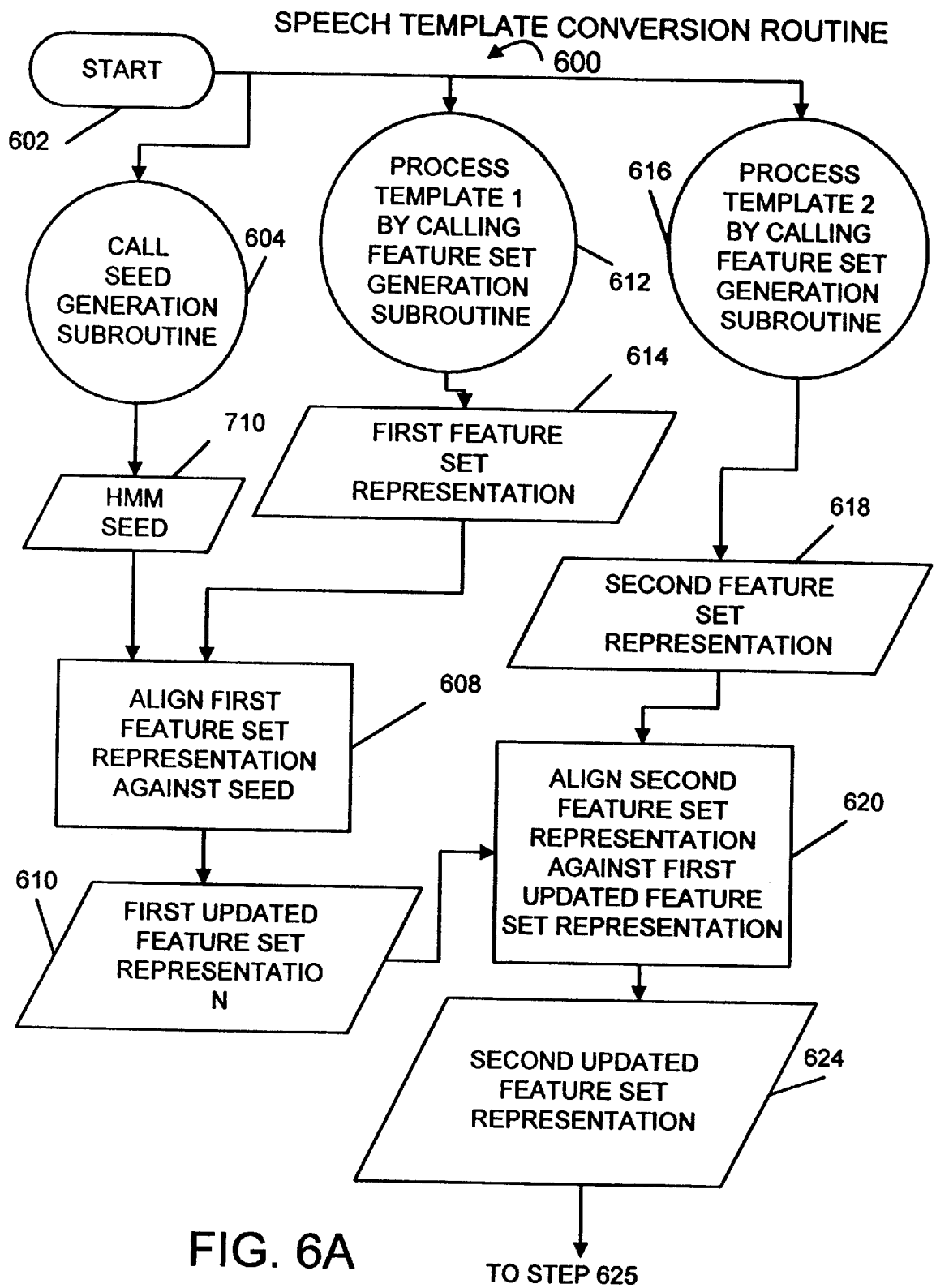
FIG. 6, which comprises the combination of FIGS. 6A and 6B, illustrates a speech template conversion routine implemented in accordance with one embodiment of the present invention.
Figure 6B:
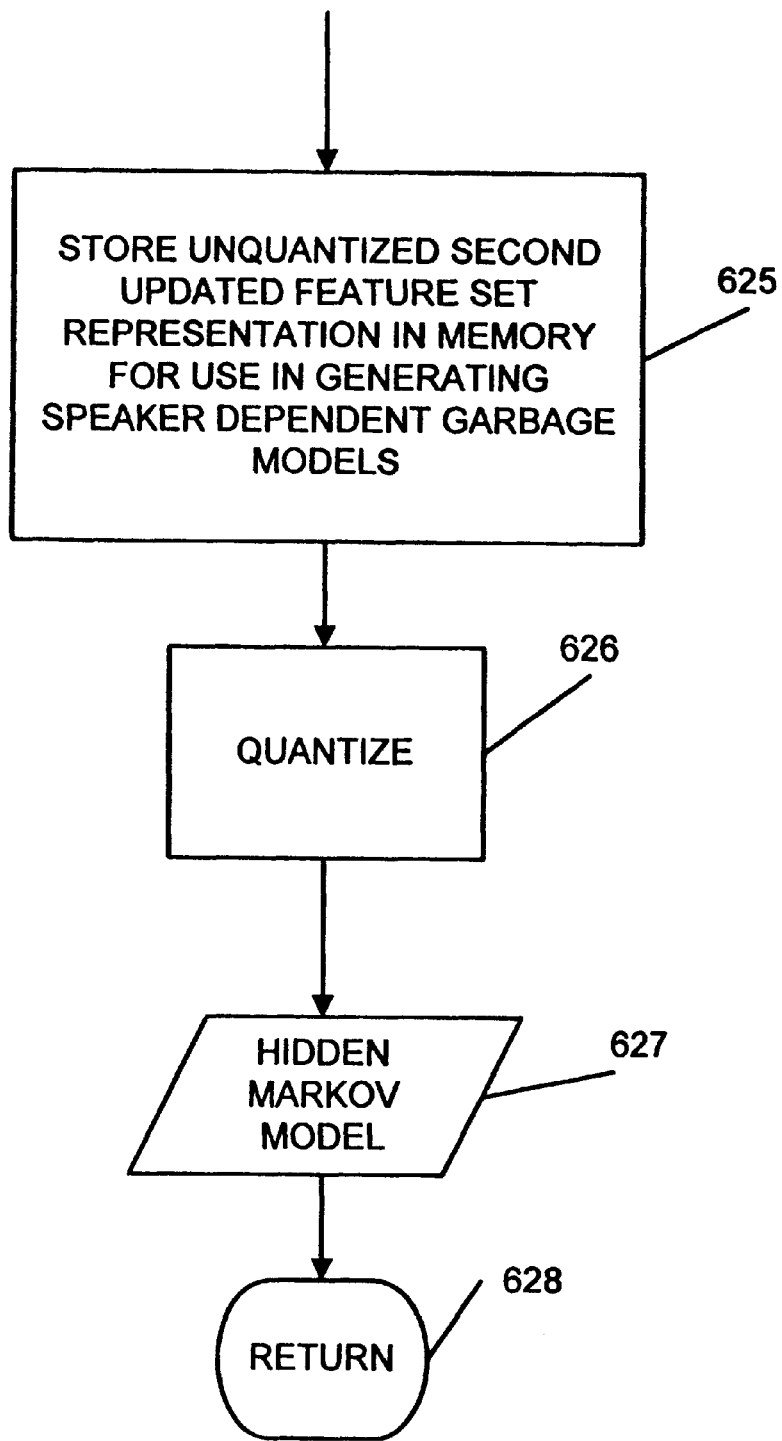

The speech template conversion routine 600 which is used to perform the conversion of speech templates into Hidden Markov models will now be discussed with reference to FIG. 6 which comprises the combination of FIGS. 6A and 6B. The speech template conversion routine 600, operating in conjunction with the subroutines illustrated in FIGS. 7 through 9, can be used to process DTW templates and voice recordings, e.g., such as those stored in the PCMR I data base 200, to generate HMM models such as those stored in the PCMR II database 400.

Referring now to FIG. 6, operation of the speech template conversion routine 600 begins with the START step, step 602. In this step, various system initialization operations are performed by the CPU 504 including, e.g., the accessing of first and second DTW templates (TEMPATE 1, TEMPLATE 2) corresponding to the same name, and a compressed voice recording of the name which are to be used in the generation of an HMM therefrom. This data may be passed from the database conversion routine to the template conversion routine at the time the template conversion routine 550 is called.

In the illustrated embodiment, operation progresses in parallel from START step 602 to steps 604, 612 and 616. Each of steps 604, 612 and 616 involve the utilization of a subroutine to perform some type of processing operation. In computer systems which do not support parallel processing, the subroutines 700 and 800, performed in these steps, may be performed sequentially, e.g., before performing the additional processing steps illustrated in FIG. 6A.

Step 604 involves calling the seed generation subroutine 700 and using this subroutine to process the compressed voice recording, representing the name for which the template is being generated.

Figure 7:
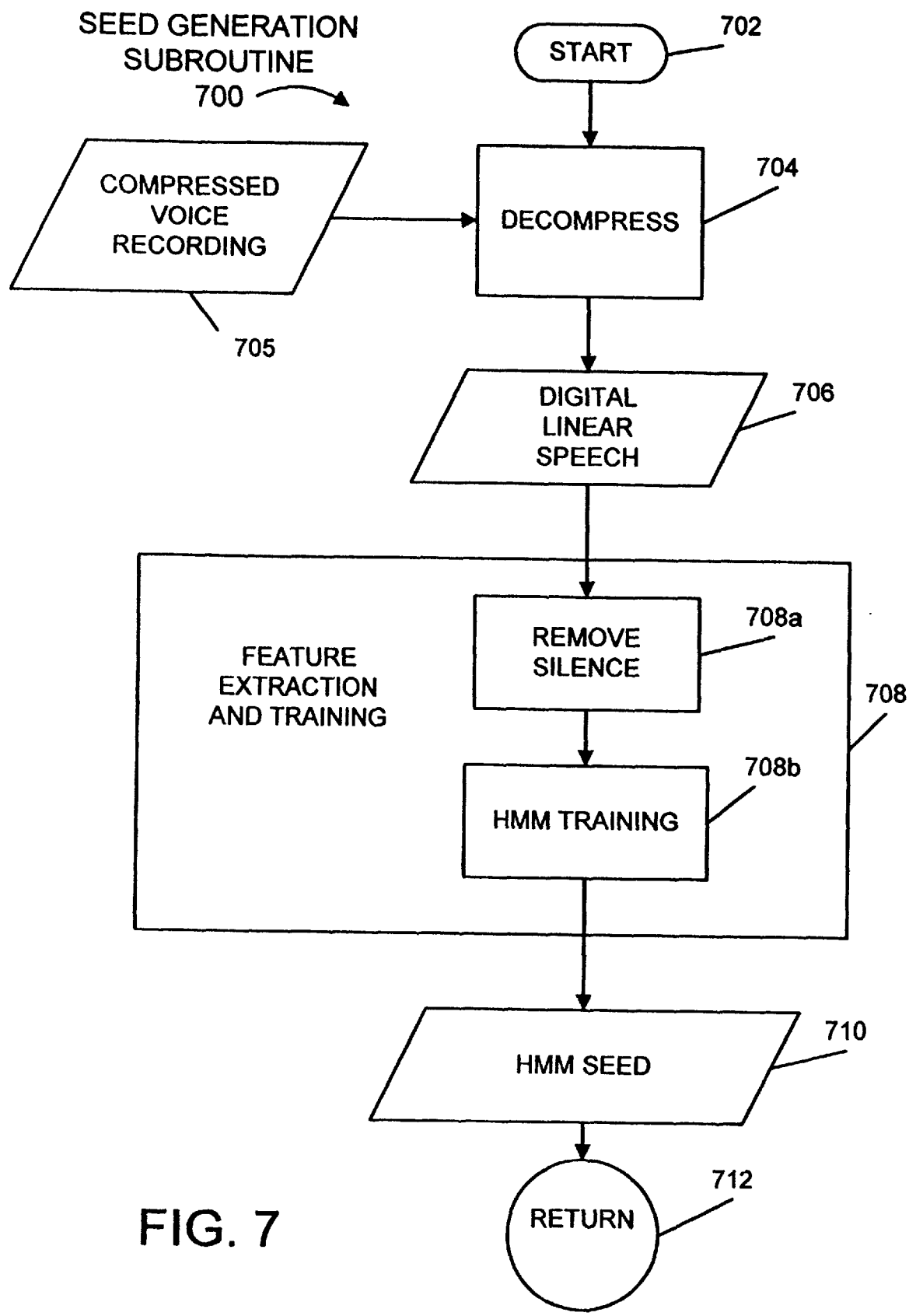
FIG. 7 illustrates a seed generation subroutine of the present invention suitable for use with the speech template conversion routine illustrated in FIG. 6.

Referring now to FIG. 7, it can be seen that the seed generation subroutine begins with start step 702 in which various initialization operations are performed. Operation progresses from step 702, to step 704, wherein the compressed voice recording represented by block 706 is decompressed. The decompression operation produces digital linear speech 706 corresponding to the name for which the model is being generated.

The digital linear speech 706, generated in step 704, is supplied to the feature extraction and training circuit 708 for processing. Step 708 comprises a silence removal step 708a which is followed by a HMM training step 708b. In step 708b, the speech input thereto is processed in a manner that is the same as, or similar to, original utterances from which a seed is generated during conventional HMM training. That is, the HMM training step 708b, includes substeps of segmenting the speech into frames, generating frame coefficient sets; processing the frame coefficient steps to identify groups of frames having similar characteristics and generating a first preselected number of feature sets to represent the frames, the generated feature sets representing a SEED 710 to be used in generating the HMM. Once the SEED 710 is generated, operation returns in step 712 to the speech template conversion routine 600. In the exemplary embodiment, the SEED is generated from the available voice recording which was preserved for confirmation purposes. However, as will be discussed below, a SEED can also be generated from a template in cases where only templates are available.

Referring once again to FIG. 6, in steps 612 and 616 which, as discussed above may be performed in parallel, first and second feature set representations are generated from the first and second stored DTW templates, respectively. In the event that a SEED is not generated from a recording one of these generated feature set representations may be used as a SEED for HMM generation purposes. Both steps 612 and 616 involve a call to the feature set generation subroutine. The difference being that step 612 involves the processing of the first DTW template to generate the first feature set representation while step 616 involves processing of the second stored DTW template to generate the second feature set representation used in generating the Hidden Markov model.

Figure 8A:
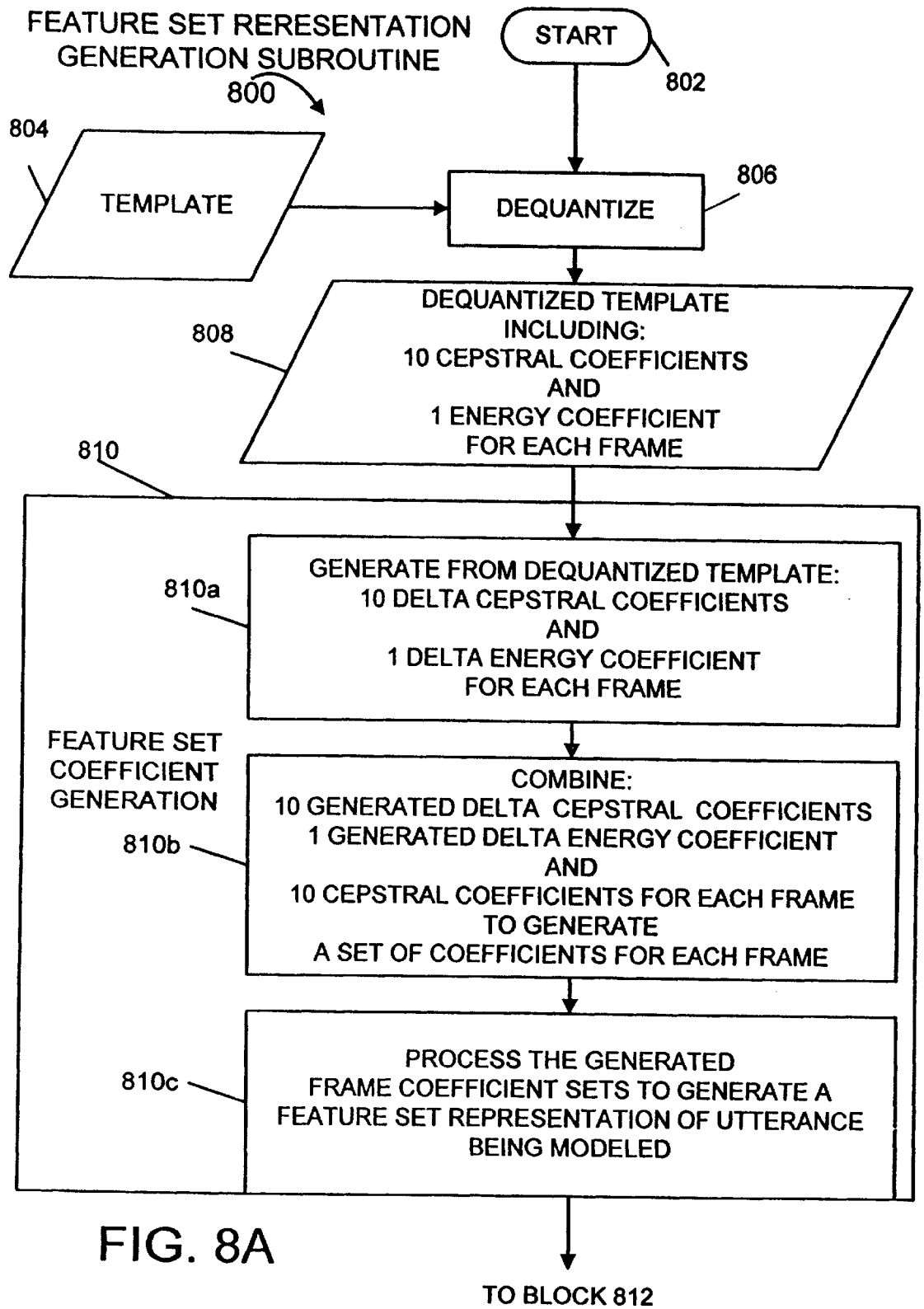
FIG. 8, which comprises the combination of FIGS. 8A and 8B, a feature set generation subroutine suitable for use with the speech template conversion routine illustrated in FIG. 6.
Figure 8B:
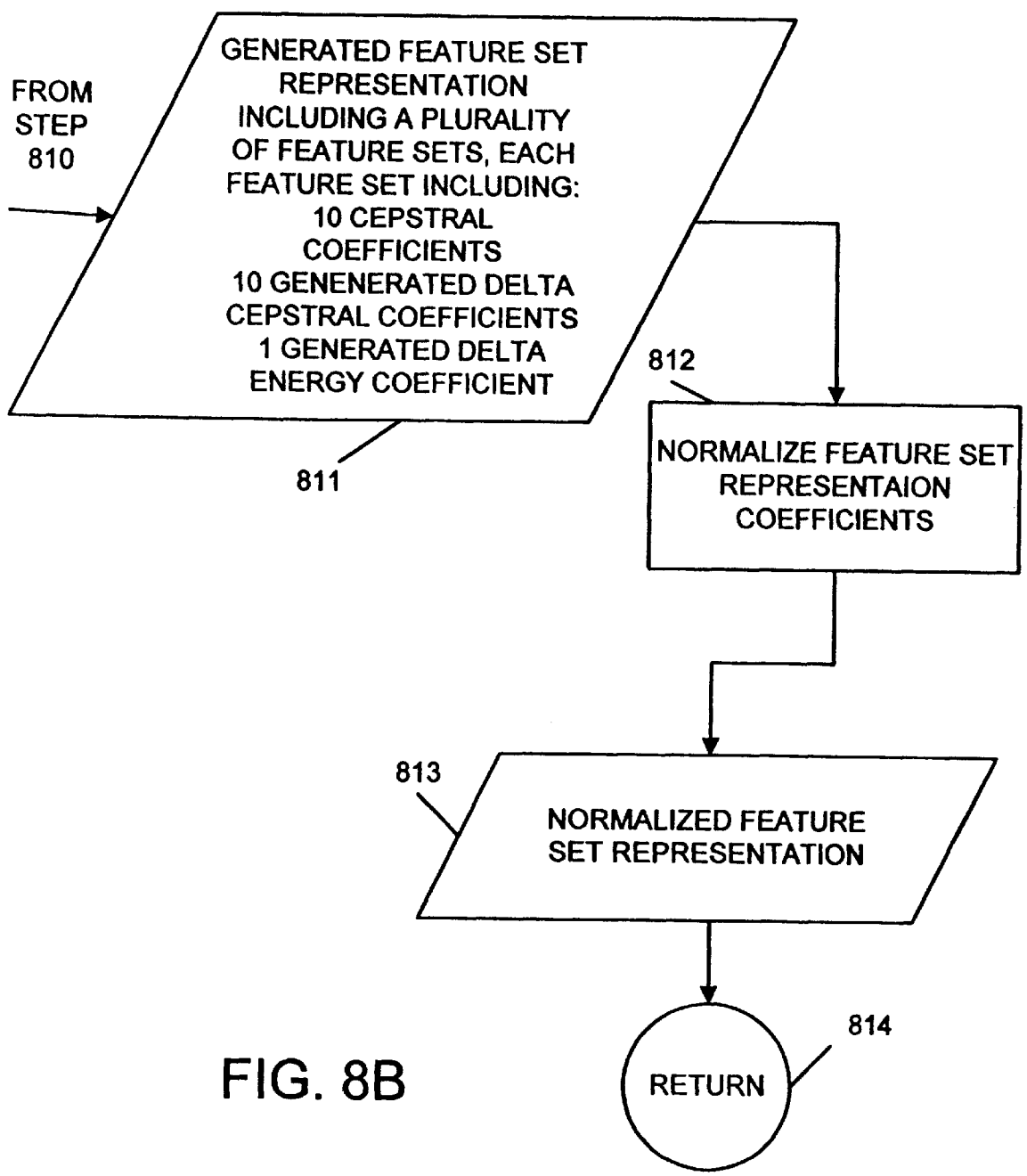

The feature set representation generation subroutine 800 will now be described with reference FIGS. 8A and 8B. In step 802 the subroutine 800 is initialized. From step 802 operation progresses to step 806. In step 806 the DTW template 804, from which the feature set representation is being generated, is dequantized. This operation results in a dequantized DTW template 808 which includes 10 cepstral coefficients and 1 energy coefficient for each frame of an utterance for which information is stored in the template 804.

In one embodiment, the dequantization step 806 involves performing an inverse quantization step that is matched to, i.e., the inverse of, the quantization process originally used to generate the quantized DTW coefficients. However, as the result of empirical tests, it was found that matching the dequantization to the original quantizer, e.g., used for quantizing the cepstra coefficients in particular, did not give the best performance and that superior recognition results could be achieved if the dequantization of the data template coefficients was optimized for performance. In one embodiment this optimization involved matching dequantization tables used in the dequantization process not to those originally used for quantization of the template coefficients but rather to those that would be subsequently used in generating the HMM as part of a subsequent quantization step.

In step 810, the dequantized template 808 is further processed to convert the data from the template into a set of feature set coefficients. As discussed above, a feature set representation of an utterance includes, in PCMR II, for each feature set, 10 cepstral coefficients, 10 delta cepstral coefficients and 1 delta energy coefficient. Delta cepstral coefficients are coefficients which indicate the change (delta) in cepstral coefficient values over a preselected period of time. Similarly, the delta energy coefficient indicates a change in an utterance's energy level over a preselected period of time.

The present invention, in step 808, takes advantage of the fact that changes in cepstral coefficient and energy values, can be calculated from the cepstral coefficient values and energy coefficient values, respectively. In step 810$a$, for each frame of the template 808, a set of 10 delta cepstral coefficients and 1 delta energy coefficient is generated using the cepstral and energy coefficients included in the template 808.

In step 810$b$, the coefficients generated in step 810$a$ for each frame, and the original cepstral coefficients for each corresponding frame of the template 808, are combined. In this manner, for each frame of the template being processed a set of coefficients, referred to herein as a frame coefficient set, is generated. In the exemplary embodiment, each generated frame coefficient set includes 10 cepstral coefficients obtained from the original template, 10 delta cepstral coefficients generated in step 810$a$, and 1 delta energy coefficient which is also generated in step 810$a$. Note that the frame coefficient sets do not include the energy coefficient included in the original template for each frame. Accordingly, after the generation of the delta energy coefficients in step 810$a$, the original energy coefficients are, in effect, discarded.

At this point in the process, the template has been converted into a plurality of frame coefficient sets with one frame coefficient set having been generated for each frame. Accordingly, the data output from step 810$b$, a plurality of frame coefficient sets, is similar to that which would have been generated during the initial portion of processing an utterance to generate a Hidden Markov Model therefrom.

In substep 810$c$ the plurality of frame coefficient sets, generated in substep 810$b$, are analyzed to find similarities between the coefficient sets. The frame coefficient sets are then grouped according to similarities, and a preselected number of feature sets are generated from the frame coefficient sets. The number of feature set may be determined as a function of the duration of the utterance represented by the template 808 as indicated by the number of frames included in the template 808. The feature set generation process results in a plurality of feature sets, referred to as a feature set representation 811 of the name (utterance) being modeled. Each feature set in the feature set representation 811 includes, in the exemplary embodiment, 10 cepstral coefficients, 10 generated delta cepstral coefficients, and 1 generated delta energy coefficient. The processing performed in step 810$c$ is the same as, or similar to, the processing performed on a plurality of frame coefficient sets when generating a Hidden Markov model from a spoken utterance. The feature set representation 811 corresponding to the utterance, originally represented by the template 808 being processed, is further processed in normalization step 812. In this step, a normalization operation is performed on the coefficient values included in the feature set representation to limit them to a preselected range of potential values. This decreases the range of values which each feature set needs to be capable of representing. The normalized feature set representation 813, generated by the feature set representation generation subroutine 800, is returned to the main speech template conversion routine 600 in step 814.

In the above described manner, as a result of the call to the feature set generation subroutine in step 612, a first feature set representation 614 is generated from the first of the stored templates. In the case where a voice recording is not available for use in generating a SEED, the first feature set representation may be used as a SEED against which a subsequently generated feature set can be aligned in order to generate an HMM.

In step 616, a second call to the feature set generation subroutine 800 is initiated. This results in the processing of the second template being used to generate the model in a manner that is the same as or similar to the processing performed on the first template. As a result of the call to the feature set generation subroutine in step 616, a second feature set representation 618 is generated from the second template.

The HMM seed 710, first feature set representation 614 and second feature set representation 618, generated in the above described manner, are further processed in the remaining steps of the speech template conversion routine 600. In particular, the HMM SEED 710 and first feature set representation 614 are processed in step 608 to generate a first updated feature set representation of the utterance corresponding to the templates which are being converted. The generation of the first updated feature set representation 610 is achieved by aligning the first feature set representation against the HMM seed. The alignment procedure can be performed in a manner that is the same as, or similar to, known alignment procedures used for generating an HMM from an original utterance.

The first updated feature set representation 610 serves, along with the second feature set representation 618, as the input to the next processing step, step 620. In step 620 another alignment operation is performed. In this step, the second feature set representation is aligned against the first updated feature set representation to generate the second updated feature set representation 624. This feature set representation effectively constitutes an unquantized HMM at this point. In step 625 the unquantized second updated feature set representation 624 is stored in memory for future use in generating speaker dependent garbage models, e.g., in step 571.

In step 626, the second updated feature set representation is quantized, e.g., using 8 bit quantization, to generate a Hidden Markov Model 627. This generated HMM 627 corresponds to the same utterance, e.g., name, to which the templates from which the model was generated correspond. Once the HMM is generated in accordance with the present invention in the above described manner, operation returns in step 626 to the database conversion routine 550.

While DTW templates can be converted into HMMS without the use of a confirmation recording as discussed above, the use of a confirmation recording in generating the converted models was found to improve performance significantly. In database tests, shown in FIG. 12, the recognition error rate decreased by 50% or more due to the use of the confirmation recording in addition to the DTW templates.

The use and generation of various garbage and background, e.g., silence, models will now be discussed with reference to FIGS. 9, 10A and 10B.

Figure 9:
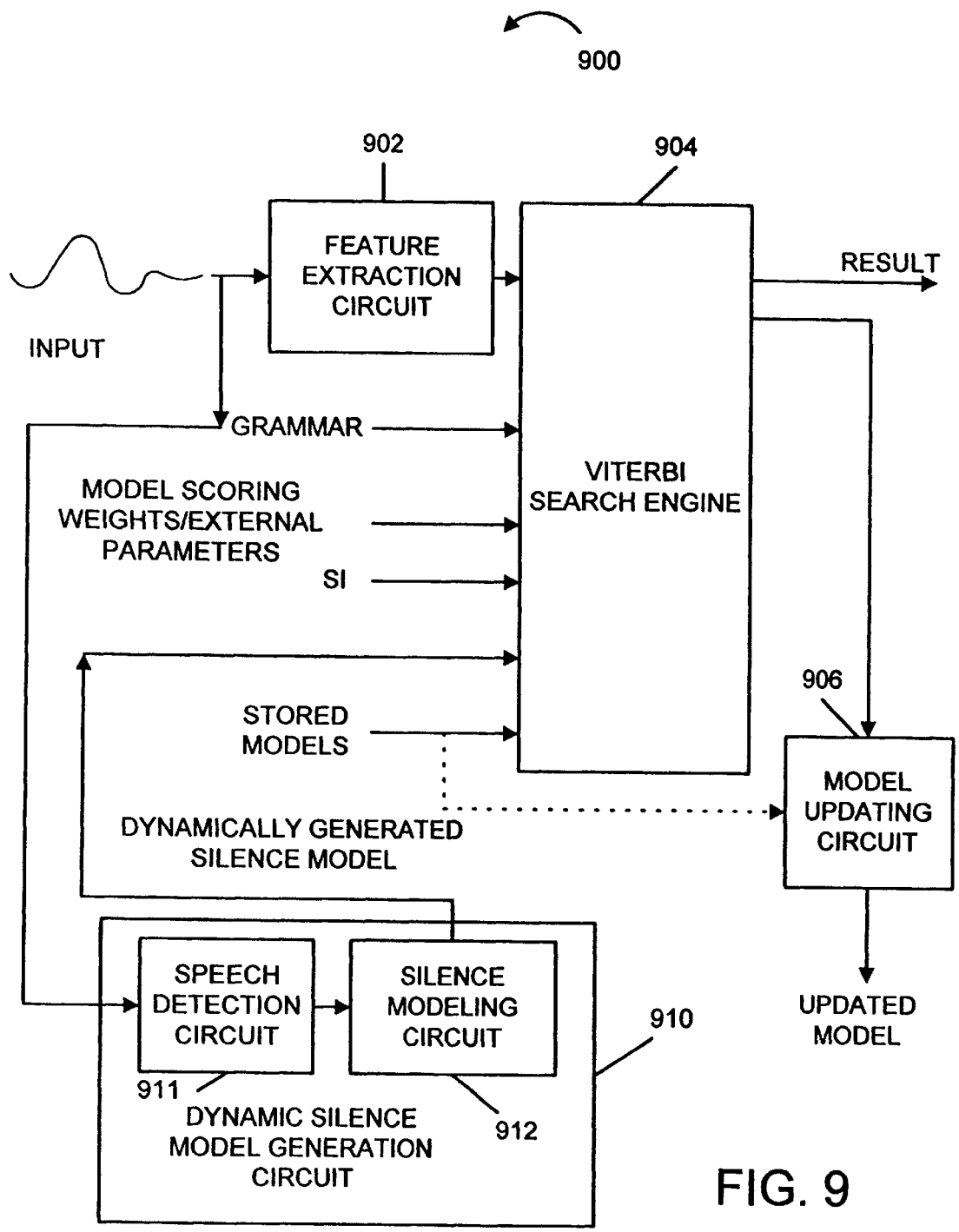
FIG. 9 illustrates a speech recognition and speech model updating circuit suitable for use in accordance with one embodiment of the present invention.

FIG. 9 illustrates a speech recognition and model updating system 900 implemented in accordance with one embodiment of the present invention. As illustrated, the speech recognition and model updating system 900 includes a feature extraction circuit 902, a Viterbi search engine 904, a model updating circuit 906, and a dynamic silence model generation circuit 910. The feature extraction circuit 902 and dynamic silence model generation circuit 910 receive a digital audio signal including speech as an input signal. The feature extraction circuit 902 divides the input speech into a plurality of frames and generates a feature set representation of the input speech therefrom. The generated feature set representation is provided as an input into the Viterbi search engine 904.

The Viterbi search engine 904 performs a beam search with pruning. It also outputs data used by the model updating circuit 906 to generate updated models to replace converted models stored in the database 400 upon receiving or detecting some indication from a user of the system that the recognition result was correct.

In a Viterbi search performed by the search engine 904, various potential paths formed by the models, grammar, and parameters used for speech recognition are compared to the speech data output by the feature extraction circuit 902. FIG. 10A, illustrates the paths 1000 resulting from the models, parameters, and grammar considered by the Viterbi search engine 904 in accordance with one embodiment of the present invention.

As a path is traversed, e.g., by comparing portions of the speech data to the path, a score is maintained for each path which indicates how closely the speech being processed matches the path. In order to reduce computational requirements, when a score at a particular point along the path falls below a preselected threshold for that point in the path, the path is pruned. That is, it is removed from consideration as a possible match for the speech being processed. When a score for one of the paths which remains under consideration exceeds a preselected threshold indicative of a match between the received speech and the name or utterance being modeled by the path, the name or utterance modeled by the path is output as the result. That is, the input speech is recognized as corresponding to the modeled path whose score exceeded the recognition threshold value. As discussed above, in generating models for names it was recognized that different weights, represented by the scoring parameters 1017, should be used for converted models and original models. This insures that converted models, which have been shown to consistently score lower than original models, will not be unduly pruned or be subject to an unreasonably high recognition threshold. The model source information, SI, may be used as an alternative to weight or external parameter information to insure that models are properly scored, e.g., based on how they were created.

The model updating circuit 906 is responsible for dynamically generating a background silence model 1024 from either the data output by the feature extraction circuit 902 or data output by the Viterbi search engine 904. In addition, the model updating circuit 906 is responsible for generating updated models to replace converted models. It does this, in accordance with one embodiment of the present invention, using data obtained from an input speech sample which has been recognized. Alternatively, it may generate new models as part of a training mode of operation.

In one particular embodiment to generate an updated model, the model updating circuit aligns the feature set representation generated from the recognized speech sample with the feature set representation included in the stored model used in the recognition operation. The updated model produced as a result of this alignment process is stored in the database 400 in place of the converted model. New source indicator information and weighting factor information may also be stored in the database 400 to reflect the updating of the model.

While the above described method of updating the models stored in the database 400 is transparent to the user of the system, a risk exists that an improperly recognized speech utterance will be used to update a stored model. To avoid this problem, in accordance with one embodiment of the present invention, the stored model is updated and/or replaced only upon detecting some indicia that the result of the recognition operation was correct. In the voice dialing case where a confirmation recording of the recognized speech is played back to the user of the system, call completion may be detected as the indicia of a correct recognition outcome under the theory that the user would abort the call before call completion, after hearing a confirmation recording, if the correct recognition operation had not occurred. In this case, call completion refers to the operation of placing a call to a telephone number associated with the recognized name or utterance and the answering of the call by the called party.

Use of garbage models in accordance with the present invention will now be discussed. In one particular embodiment, the present invention is used to support voice dialing. In voice dialing applications a user may utter names which are not in his speech recognition database, e.g., directory, not remembering whether they were trained or not. This can occur with less frequently used names. In the situation where a plurality of users, e.g., a family, shares a single speech recognition directory, multiple users can aggravate a false-acceptance problem. In the embodiment which uses the grammar and models illustrated in FIG. 10, a word-pair grammar is built during recognition, training, or template conversion processing utilizing speaker-specific information, e.g., the converted speaker dependent recognition models. The models 1016, 1018, 1019 for competing names trained by the user or generated from converted templates are on parallel arcs in the grammar illustrated in FIG. 10A. Additionally three speaker dependent garbage models 1010, 1012, 1014 and one speaker-independent garbage model 1001 are placed on arcs parallel to the name models 1016, 1018, 1019, to provide out-of-vocabulary rejection. The speaker dependent garbage models 1010, 1012, 1014 may be generated in step 571 of the database conversion routine 550.

In an exemplary embodiment, the three speaker-dependent garbage models 1010, 1012, 1012 have, respectively, a fixed number of states corresponding to one of three possible numbers of states which may be assigned to an utterance during training or the template conversion process.

Each of the three speaker dependent garbage models is computed as a composite of the speaker dependent name models which are assigned a corresponding number of states. Noting that there may not be any names corresponding to one of the three possible numbers of states, in one embodiment each of the garbage models is seeded from the first utterance spoken by the user, using an averaging scheme, and the garbage model is then updated subsequently as models having the corresponding number of states are trained from speech provided by the user or generated from converted templates.

As a result of the modeling process and grammar used, the generated speaker dependent garbage models 1010, 1012 and 1014 act as duration-wise out-of-vocabulary models. The probability attached to the grammar arcs for the speaker-dependent garbage models 1010, 1012, 1014 is linearly adjusted, in one embodiment, according to the number of names (utterances) contributing to the garbage models generation. This avoids or reduces problems that may result from the over-representation of one particular name in a garbage model.

Figures 11, 12:
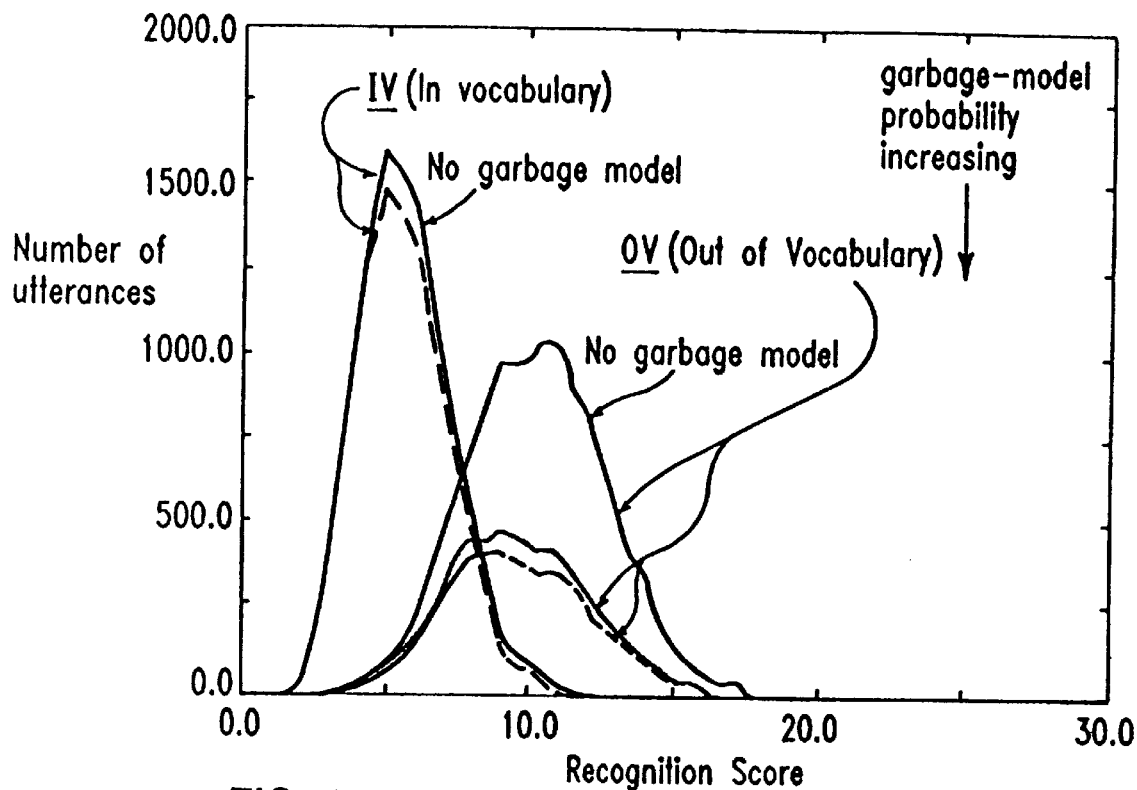
FIG. 11 illustrates histograms of scores for utterances recognized as in-vocabulary, in one particular database test.
FIG. 12 is a table listing exemplary recognition error rates measured during tests of Hidden Markov Models generated from DTW templates with and without the use of a compressed confirmation recording.

FIG. 11 illustrates histograms of scores for utterances recognized as in-vocabulary, in one particular database test. Tests have shown that the use of speaker dependent garbage models in accordance with the present invention are effective in reducing false accepts without a large penalty in correct accepts.

Figure 10:
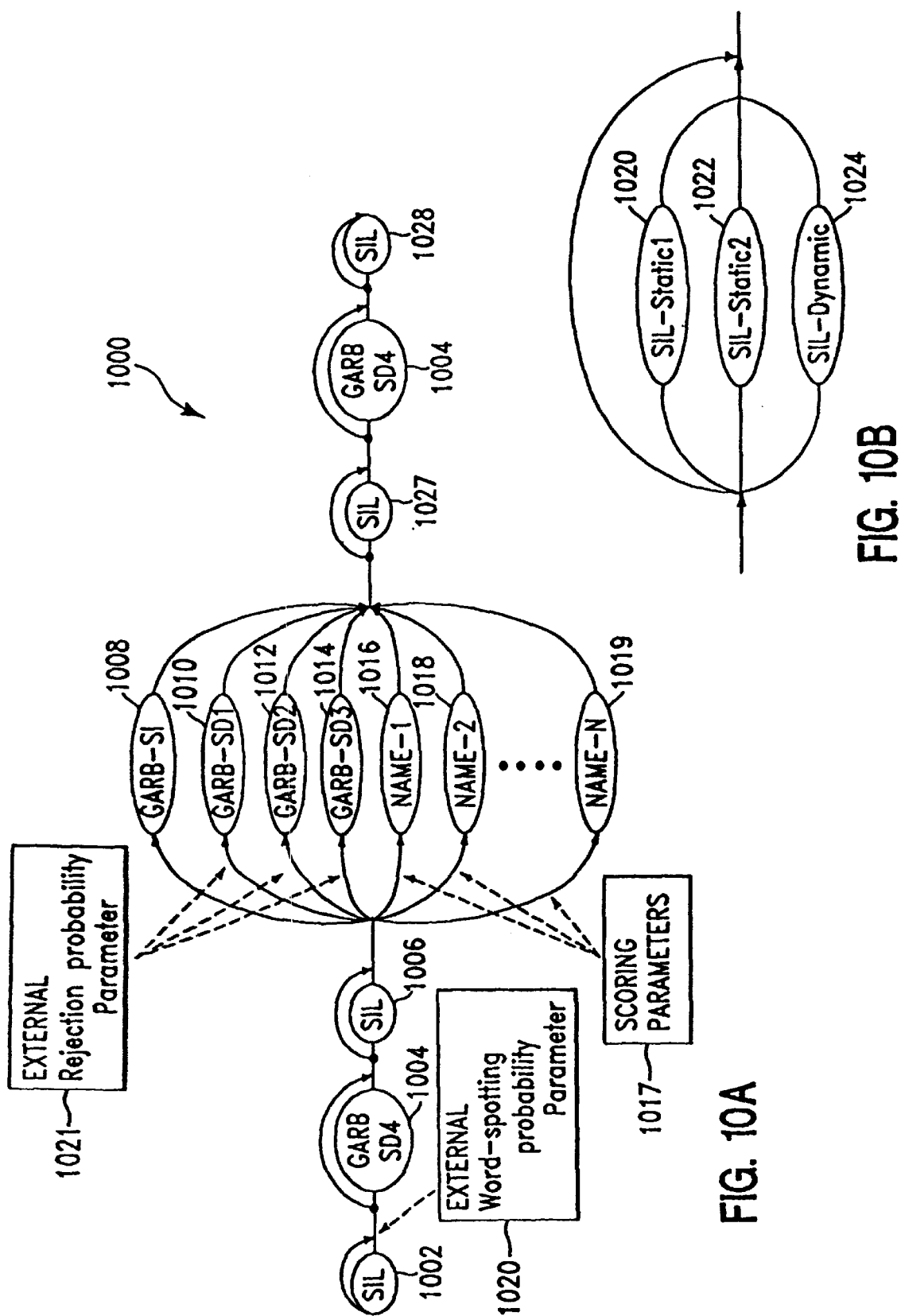
FIG. 10A illustrates a plurality of speech recognition possibilities, represented in the form of paths, generated by the illustrated grammar, parameters, and models which are used as part of a speech recognition operation in accordance with one embodiment of the present invention.
FIG. 10B illustrates a configuration for a silence model suitable for use in the grammar illustrated in FIG. 10A.

In the exemplary embodiment used to produce the graph illustrated in FIG. 11, a score threshold (in this example around 10.0) has been shown to be effective in reducing false accepts further by about 50% for a very small in-vocabulary penalty. The single speaker-independent garbage model 1008 used in the embodiment illustrated in FIG. 10, is built from a large number of isolated utterances, e.g., utterances collected over the telephone network.

The use of this speaker independent garbage model 1008, in combination with the speaker dependent garbage models 1010, 1012, 1014, further enhances out-of-vocabulary rejection.

In voice dialing applications, the situation frequently arises wherein a user has trained a first name (e.g., "John") but forgets and says the full name ("John Smith"). Additionally, other peripheral speech, household conversation, radios are observed in voice dialing usage. To deal with such peripheral speech word-spotting techniques are used.

In one particular embodiment, a fourth speaker dependent garbage model 1004, i.e., a speaker dependent word spotting garbage model, is built as a single-state composite of the multiple speaker-dependent garbage models 1010, 1012, 1014 and incorporated into the grammar preceding and following the other speaker dependent garbage models from which it is created. The composite speaker dependent garbage model 1004 effectively forms a speech model for the specific speaker. As illustrated in FIG. 10, grammar arcs with this composite speaker dependent model precede and succeed the target-speech arcs associated with the name models 1016, 1018, 1019.

Thus, in the embodiment illustrated in FIG. 10, target utterances spoken with preceding or succeeding speech are recognized correctly. Additionally, this use of a composite garbage model 1004 has proven effective in capturing other peripheral sounds.

The composite speaker dependent garbage model 1004 can be generated by first generating the speaker dependent garbage models 1010, 1012, 1014 from a plurality of speaker dependent models, e.g., name models, as discussed above and then generating a composite speaker dependent garbage model from the previously generated garbage models.

In addition to speaker dependent and speaker independent garbage modeling, the present invention supports background, also sometimes referred to as silence, modeling.

Silence models may be static, e.g., generated by a training operation before a specific speech operation and then used without modification. Alternatively, in accordance with one embodiment of the present invention, silence models may be dynamic, e.g., generated in real time for a particular speech recognition task. In accordance with the present invention, the circuit 910 is used to generate dynamic silence models at recognition time as a function of the period of silence in the input audio signal which precedes the actual speech content of the signal.

Background or silence modeling is important to improving alignment of incoming speech and models. To this end, in one embodiment 3 single-state silence models were built from a body of collected data for the exemplary voice dialing embodiment illustrated in FIG. 10A. The training data used to generate these silence models was coarsely classified by average energy level, and the data was then used to build silence models for the environment in which the voice recognition system was expected to be used and the silence modeling data obtained, e.g., the telephone environment. Despite the presence of the silence models it was observed during testing that Viterbi alignment could still be inaccurate for a specific device, e.g., switch, telephone-set, etc. due to peculiarities the device.

In order to overcome the problems associated with the use of static silence models generated from a large collection of data, the new and novel concept of dynamic silence modeling was incorporated into the exemplary speech recognition system of the present invention. In accordance with the present invention, when possible, a dynamic silence model is generated and used to replace one of three previously generated static silence models resulting in a silence model 1021 of the type illustrated in FIG. 10B which includes two static silence models 1020, 1022 and one dynamically generated silence model 1024. The silence model 1021 may be substituted for and thus serve, as the silence models 1002, 1006, 1027 and 1028, illustrated in FIG. 10A.

In the exemplary voice dialing embodiment speech detection is used to initiate recognition. The signal data prior to speech onset represents the actual ambiance and, in accordance with the present invention, is used to dynamically build the silence model 1024 on-line. This occurs when the speech detection circuit 911 detects that there is a sufficiently long period of silence prior to the onset of speech to service as a model before speech is detected. The speech detection circuit 911 may be implemented using a threshold comparator with speech being detected as a signal value exceeding a selected threshold value.

The portion of the received input signal which precedes the detected speech is used by the silence modeling circuit 912 to generate the dynamic silence model. The duration of the portion of the received signal is measured by the silence modeling circuit 912, e.g., in terms of frame times. A period of silence of multiple frame times, e.g., 10 or more frame times, is sufficient for generation of a silence model in most cases. This dynamically generated silence model 1024 is used, in one embodiment, in parallel with fixed silence models 1020, 1022 as illustrated in FIG. 10. In the event that there is insufficient time before the onset to serve as the basis of a dynamic silence model, a previously generated static silence model is used in place of the dynamic silence model 1024.

As a practical matter, it has been found at least in regard to telephone voice dialing applications, in the vast majority of cases, there is an ample period of silence before the onset of speech to serve as the basis of a dynamically generated silence model.

In tests, the dynamic silence model 1024 was found to frequently be part of the Viterbi best path, indicating that its use is effective.

Recognition and training of the speech recognition system of the present invention is driven by a set of configurable parameters or weights that can be modified according to the needs of an application, and/or to address site-specific or customer-specific issues including speech recognition model generation and scoring issues as discussed above. Parameters that are used to modify the grammar and the Viterbi search include externally input grammar, word spotting an scoring probabilities to be attached to the speaker-dependent garbage models, the application-specific garbage models, and the word-spotting garbage models. Additional parameters may be used to control pruning beam width, etc. Parameters that are used to control post-processing, e.g., recognition score threshold used for rejection, various training score thresholds for testing the similarity to existing names, and the consistency of training utterances, duration limits for very short or long utterances, and parameters for testing Viterbi alignment may also be adjusted and used to control or modify, e.g., fine tune, the speech recognition process in accordance with the present invention.

What is claimed is:

1. A method of using a first set of speech characteristic information including one of a speech recognition template and a speech recognition model which was previously generated for use by a first speech recognition system, to generate a second set of speech characteristic information for use by a second speech recognition system, the method comprising the steps of:

generating, from the one of the speech recognition template and model included in the first set of speech characteristic information, additional speech characteristic information not included in the first set of speech characteristic information; and combining the generated additional speech characteristic information, with at least some information obtained from the first set of speech characteristic information, to generate the second set of speech characteristic information.

2. The method of claim 1, further comprising the steps of:

generating an indicator of the source of the second set of speech characteristic information; and storing the second set of speech characteristic information and the source indicator in a database.

3. The method of claim 2, further comprising the steps of:

generating an additional set of speech characteristic information and second weighting factor information which is different from the first weighting factor information; and storing the additional set of speech characteristic information and second weighting factor information in the database.

4. The method of claim 1, further comprising the steps of:

generating first weighting factor information to be used when performing scoring as part of a speech recognition operation using the second set of speech characteristic information; and storing the generated weighting factor information and the second set of speech characteristic information in a database.

5. The method of claim 1, wherein the first and second sets of speech characteristic information are sets of speaker dependent speech recognition information;

wherein at least a portion of the first set's speech characteristic information represents speech characteristic values corresponding to a period of time; and wherein the step of generating additional speech characteristic information includes the steps of:
   i. calculating, from the first set's speech characteristic information, changes over preselected speech time intervals for at least a portion of a first plurality of speech characteristic values included in the first set of speech characteristic information;
   ii. generating a second plurality of speech characteristic values, representing the calculated changes in the portion of the first set's speech characteristic values.

6. The method of claim 5, wherein the first set of speech characteristic information includes quantized data, the method further comprising the steps of:

performing an inverse quantization operation on said quantized data using a first set of quantization values; and performing a quantization operation on the second set of speech characteristic information using a second set of quantization values which is different than the first set of quantization values.

7. The method of claim 6, wherein the first set of quantization values is different than a set of quantization values originally used to quantize the quantized data included in the first set of speech characteristic information.

8. The method of claim 6, further comprising the step of:

generating a speaker dependent garbage model from the second set of speech characteristic information.

9. The method of claim 1, wherein the first set of speech characteristic information includes energy coefficients; and wherein the step of generating additional speech characteristic information includes the step of:
   calculating delta energy coefficients.

10. The method of claim 1, wherein the first set of speech characteristic information includes cepstra coefficients; and wherein the step of generating additional speech characteristic information includes the step of:
    calculating delta cepstra coefficients.

11. The method of claim 10, wherein the first set of speech characteristic information further includes energy coefficients; and wherein the step of generating additional speech characteristic information further includes the step of:
    calculating delta energy coefficients.

12. The method of claim 11, further comprising the step of:

combining the generated delta cepstra, delta energy and cepstra coefficients to form a speech recognition model without including in said model the energy coefficients from the first set of speech characteristic information.

13. The method of claim 11, wherein the first set of speech characteristic information is a dynamic time warping template and wherein the second set of speech characteristic information is a Hidden Markov Model.

14. A method of using a first set of speech characteristic information which was previously generated for use by a first speech recognition system, to generate a second set of speech characteristic information for use by a second speech recognition system, the first set of speech characteristic information representing a segment of audible speech, the method comprising the steps of:

generating, from the first set of speech characteristic information, additional speech characteristic information not included in the first set of speech characteristic information;

combining the generated additional speech characteristic information, with at least some information obtained from the first set of speech characteristic information, to generate the second set of speech characteristic information;

decompressing a compressed voice recording;

generating a third set of speech recognition characteristic information from the decompressed voice recording; and combining the second and third sets of speech characteristic information to generate a fourth set of speech characteristic information.

15. A method of using a first set of speech characteristic information which was previously generated for use by a first speech recognition system, to generate a second set of speech characteristic information and for using the second set of speech characteristic information, the first set of speech characteristic information representing a segment of audible speech, the method comprising the steps of:

generating, from the first set of speech characteristic information, additional speech characteristic information not included in the first set of speech characteristic information;

combining the generated additional speech characteristic information, with at least some information obtained from the first set of speech characteristic information, to generate the second set of speech characteristic information;

generating an indicator of the source of the second set of speech characteristic information;

storing the second set of speech characteristic information and the source indicator in a database;

using the second set of speech characteristic information and generated speaker dependent garbage model to perform a speech recognition operation on speech provided by a user against the seed.

16. The method of claim 15, further comprising the step of:

monitoring to detect indicia from the user that the outcome of the speech recognition operation was correct; and when indicia that the outcome of the speech recognition operation was correct is detected, updating the second set of speech characteristic information as a function of the speech provided by the user.

17. The method of claim 16, wherein the method further comprises the step of:

receiving, via a telephone line, the speech provided by the user;

dialing a telephone number and playing a recording to the user associated in a database with the recognized speech; and wherein the indicia of correct speech recognition is the user of the system allowing completion of the dialed call.

18. A method of converting a speech recognition template including a first set of speech characteristic data into a second speech recognition template including a second different set of speech characteristic data, the method comprising the steps of:

processing the first set of speech characteristic data included in the first template to produce therefrom a first generated set of speech characteristic data;

decompressing a compressed speech recording to generate decompressed speech;

processing the decompressed speech to generate a third set of speech characteristic data;

generating the second set of speech characteristic data included in the second template, from the first set of speech characteristic data, the generated first set of speech characteristic data, and the third set of speech characteristic data.

19. The method of claim 18, wherein the step of processing the first set of speech characteristic data includes the steps of:

performing in inverse quantization operation on the first set of speech characteristic data to generate a plurality of coefficient values therefrom; and generating delta coefficient values from said plurality of coefficient values.

20. The method of claim 18, wherein the step of generating the second set of speech characteristic data includes the steps of;

generating a seed from the third set of speech characteristic data;

generating a first feature set representation from a portion of the first set of data and the generated first set of data; and aligning the first feature set representation against the seed.

21. The method of claim 20, wherein the quantization operation performed on the first set of speech characteristic data is not a direct inverse of a quantization operation used to generate the initially create the first set of speech characteristic data.

22. The method of claim 20, further comprising the step of:

generating a speaker dependent garbage template from the second template.

23. The method of claim 22, wherein the first template is a dynamic time warping template corresponding to a single utterance of speech; and wherein the second template is a Hidden Markov Model corresponding to a plurality of speech utterances.

24. The method of claim 23, further comprising the step of:

utilizing the second template to perform a speech recognition operation on an utterance provided by the user; and providing a service associated with the second template in a database, when it is determined that there is a match between the utterance provided by the user and the second template.

25. The method of claim 24, further comprising the step of:

performing a model updating operating using the utterance provided by the user when it is determined that there is a match between the provided utterance and the second template.

26. An apparatus comprising:

means for generating a second speaker dependent speech recognition template having a second format and second data content from a first speaker dependent speech template having a first format and a first data content, the first and second formats being different; and means for storing the second speaker dependent speech recognition template in a database.

27. The apparatus of claim 26, wherein said means for generating a second speaker dependent speech recognition template further includes:

means for processing the first speaker dependent speech recognition template to generate a first set of speech characteristic data;

means for processing a third speaker dependent speech recognition template having the first format to generate a second set of speech characteristic data; and means for processing the first and second sets of speech characteristic data to generate the second speech template.

28. The apparatus of claim 27, further comprising:

means for generating a speaker dependent garbage model from the second speaker dependent speech recognition template.

29. The apparatus of claim 28, further comprising: means for generating an indicator of the source of the second speaker dependent speech recognition template.

30. The apparatus of claim 29, further comprising:

means for generating weighting factor information to be used during speech recognition operations associated with the second speaker dependent speech recognition template; and wherein the storing means includes means for storing the generated weighting factor information with the second speaker dependent speech recognition template in the database.

* * * * *